United States Patent [19]
Candelore et al.

[11] Patent Number: 6,061,449
[45] Date of Patent: May 9, 2000

[54] SECURE PROCESSOR WITH EXTERNAL MEMORY USING BLOCK CHAINING AND BLOCK RE-ORDERING

[75] Inventors: Brant Candelore, San Diego; Eric Sprunk, Carlsbad, both of Calif.

[73] Assignee: General Instrument Corporation, Horsham, Pa.

[21] Appl. No.: 08/949,111

[22] Filed: Oct. 10, 1997

[51] Int. Cl.⁷ .................................................. H04L 9/28
[52] U.S. Cl. ........................... 380/28; 713/168; 713/170
[58] Field of Search ................................. 380/28, 4, 36, 380/28.36

[56] References Cited

U.S. PATENT DOCUMENTS

| | | | |
|---|---|---|---|
| 4,149,035 | 4/1979 | Frutiger | 380/36 |
| 4,319,079 | 3/1982 | Best | 380/29 |
| 4,465,901 | 8/1984 | Best . | |

OTHER PUBLICATIONS

W. Stallings, Network and Internetwork Security, IEEE Press, Englewood Cliffs, New Jersey, U.S.A., pp. 59–61, 1995.

*Primary Examiner*—Gail O. Hayes
*Assistant Examiner*—Christopher M. Tucker
*Attorney, Agent, or Firm*—Barry R. Lipsitz; Ralph F. Hoppin

[57] ABSTRACT

A scrambled data transmission is descrambled by communicating encrypted program information and authentication information between an external storage device and block buffers of a secure circuit. The program information is communicated in block chains to reduce the overhead of the authentication information. The program information is communicated a block at a time, or even a chain at a time, and stored temporarily in block buffers and a cache, then provided to a CPU to be processed. The blocks may be stored in the external storage device according to a scrambled address signal, and the bytes, blocks, and chains may be further randomly re-ordered and communicated to the block buffers non-sequentially to obfuscate the processing sequence of the program information. Program information may be also be communicated from the secure circuit to the external memory. The program information need not be encrypted but only authenticated for security.

53 Claims, 6 Drawing Sheets

SECURE PROCESSOR WITH EXTERNAL MEMORY USING BLOCK CHAINING AND BLOCK RE-ORDERING

BACKGROUND OF THE INVENTION

The present invention relates to an apparatus for efficiently and securely transferring blocks of program information between a secure circuit and an external storage device. The program information is communicated in block chains for more robust encryption, execution obfuscation, and to reduce authentication data overhead.

In one embodiment, the program information is encrypted and optionally authenticated in cipher block chains.

In another embodiment, the program information is authenticated and optionally encrypted in block chains. Block chains greatly reduce authentication data overhead. Address scrambling may be used for heightened security.

Re-ordering of fields such as blocks or bytes within each chain, as well as among entire chains, may further be used to provide even more security.

In another embodiment, blocks of program information are provided to the secure circuit to generate a key. The key may be used to decrypt a data transmission.

The invention is particularly suitable for deterring the copying and reverse engineering of proprietary software algorithms, and for securing cryptographic applications such as the descrambling of pay television programs or the like.

The following definitions are provided:

Secure Circuit:

A secure circuit may be a cryptographic integrated circuit (IC) in which no one, not even the owner, has access to the internal buses, registers, and other circuitry contained within the IC. The IC may hold sensitive key, identification, and other data. However, the secure circuit does not have to be defined by the perimeter of an IC. It could be a Personal Computer (PC), for instance, in a network computer executing a program from a shared storage device accessed over a network. The network computer could be accessing a server for running applications real-time. Portions of the applications are communicated piece-meal to the network computers. The network can allow multiple computers to access the same application at the same time. With a PC, the owner might have access to the decrypted and/or authenticated and/or re-ordered program information received. Moreover, a secure circuit may process unencrypted but authenticated data.

Storage Device:

A storage device is a discrete memory component, such as an IC, of various types. However, as in the PC example described above, the storage device could be a mass storage device such as a hard disk drive located locally or remotely. If remotely located, data could be communicated between that storage device and the secure circuit over an Ethernet-like network, or for example, according to the IEEE 1394 standard. Local access to the mass storage device, for example, may be over the PC's ISA, VESA, or PCI data bus or it could even be through a SCSI, serial, or parallel interface. The mass storage device may be accessed by other network computers, or secure circuits. The storage device could also be a Jazz™ drive, tape, CD-ROM, DVD, Personal Computer Memory Card Interface Adapter (PCMCIA), smart card, or any other type of mass storage device.

It is possible, for instance, in the case of the network computer, that program information that is read-only is accessed over the network. A local storage device, e.g., memory, that allows read/write capability may be used that is secure for external storage purposes. Therefore, the storage device may be any combination of device types. And, in the case of a networked storage device, the program information may be copied piece-meal to a faster local memory which may be synchronous dynamic memory.

Program Information:

Program information refers generically to any information that is used by the secure circuit in the execution of a program. This may include instructions such as operational codes (op-codes) in machine code, or pseudo code or interpreted code, such as Java™. It may include look-up tables, stored keys, and various temporary data such as intermediate calculations and the state of the secure circuit.

It may even include some or all of the initialization vectors and keys used to encrypt/decrypt or verify/authenticate the rest of the program information in block chains. This can allow the same vector or key information to be encrypted under different keys so that different secure circuits individually or as select groups may gain access to the same program information, and have derived or been delivered different keys.

The information could include key information and data having to do with the nature of how the bytes of a block, blocks of a chain, and chains are stored in the storage device. This might include the order permutation information of the various fields of a chain or chain sequences describe in more detail later.

Hash:

Hash does not strictly denote a one-way function. Although a strict one-way function is a possibility, the function may be reversible under a secret key, or a trap-door one-way function, or be a very simple function such as an XOR operation.

Data Transmission and Cryptographic Processing:

Data transmission is used for text, messages, video, and audio signals of all types. These include but are not limited to text, messages, video, and audio from broadcast and interactive television and radio, program guides, news services, and interactive message traffic over communication channels. The scrambled data transmission may be sent various ways, e.g. via a broadcast, satellite, cable, telephone, or other link, or from a removable mass storage medium such as a Digital Video Disk, tape, Compact Disk (CD), floppy-disk, or other secure circuit, and received by a descrambling receiver, e.g., decoder such a set-top box, player or a personal computer in a consumer's home.

The data transmission could simply be a response to a challenge. The challenge causes the secure circuit to transform the challenge information with some type of cryptographic processing to create an output that verifies that the secure circuit indeed holds certain secret or private keys.

Internal registers in the secure circuit may be incremented or decremented. These values may be computed along with the secret or private keys to calculate the value to output. Such challenge and response techniques are typically used to authenticate the presence of valid secure circuit before a service is granted.

Cryptographic Processing:

This is processing performed by a secure circuit which typically results in the generation of a key. The key may then be used for many things: scrambling and descrambling a data transmission, identity verification by a client or host, etc. The key does not have to always be self contained within the secure circuit. For example, it may be sent out of the secure circuit for verification reasons.

Various problems with prior art schemes are now addressed.

Problem: Various Proprietary Algorithms can be Stolen

Software painstakingly developed at great expense may be trivially copied from external storage devices. The problem is exacerbated by open networks such as the Internet which can allow rapid and far flung distribution of the pirated code.

With the increasing speeds of general purpose processor chips, there is a trend to perform many processing tasks that were once done in hardware in software. The software is communicated through the use of discrete memory components and/or storage devices including mass storage devices. This can allow for quick reconfiguration of the processing system for different applications by simply executing different software. But that trend is hampered by the fact that the software can be easily copied, disassembled, reversed-engineered, and subsequently distributed thereby depriving the developer and/or inventor of the benefit of this intellectual property.

Also, with increasing speed and reliability of networks, e.g. Ethernet going from 10 megabits per second, to 100 megabits per second and so on, it is realistic to implement systems whereby software can be executed real-time over a network. So-called network computers would always be accessing the latest revision of an application loaded on a network based server. Any application in the archives of this server could be accessed quickly. But such servers may be susceptible to someone downloading and storing the entire application, thereby depriving the service provider of on-going revenue. Once downloaded, the software could be easily shared with others.

It would therefore be desirable to make software analysis and reverse engineering, as well as software copying and re-use by general purpose processors more difficult.

Problem: Cryptographic Key Generator

Cryptographic applications typically involve the generation/derivation of a key based on secret or private key information.

A typical cryptographic key generator performs cryptographic processing on data transmissions. Scrambling data transmissions have become increasingly important due to the need to deter unauthorized persons (e.g., pirates) from gaining access to data transmissions. No matter how the data is transmitted or delivered, the cryptographic processing is present to ensure that providers of the data, e.g., the scrambling senders, get paid for the intellectual property they are transmitting. In the case of a communications network, messages may be scrambled to ensure the privacy of messages, and to authenticate both the sender and recipient. It can allow for non-repudiation, to prevent a recipient from later claiming that they did not order the data. Non-repudiation is important to providers because they have a higher expectation of getting paid. No one else has the cryptographic keys necessary to authenticate messages like the bona fide buyer. The data transmission is cryptographically processed, e.g., scrambled, prior to transmission under one or more secret scrambling keys. The cryptographically processed data transmission is received by a cryptographic de-processor (descrambling receiver) such as a set-top box, media player, or a personal computer in a consumer's home.

Typically, the cryptographic processing such as what is done by a descrambling receiver is done in a secure circuit. The secure circuit is provided with the required keys at the time of manufacture or application installation and initialization, and performs a type of processing to grant access to the data transmission. If access is allowed, then the decryption key is derived. When the decryption key is used in conjunction with associated hardware or software decryption module, the data transmission is descrambled, e.g., made viewable or otherwise suitable for the user.

The descrambling hardware or software may be included in a secure circuit such as an application-specific IC (ASIC).

Likewise, the scrambling sender, e.g., a PC in someone's home scrambling information such as credit card numbers for delivery to a merchant over the Internet, uses the required keys loaded at the time of manufacture or application installation and initialization, to derive a key to scramble the sensitive data for transmission.

In the PC example, the scrambling can be done in a software module, but the scrambling may not actually take place in what is considered the secure circuit. The key derived in either case (for scrambling and descrambling) may be output from the secure circuit to the hardware or software scrambling/descrambling module, or it may hold the key internally to the secure circuit—with the decryption module internal to the secure circuit. Preferably, the key is held and the scrambling/descrambling is performed internally to the secure circuit.

If the key is output from the secure circuit, it can be changed very quickly, even several times a second, thereby making its knowledge only of short lived use. The hardware scrambling/descrambling hardware or software module may be located remotely from the secure circuit which derived the key to scramble/descramble the data transmission.

For a PC executing instructions over a network, the secure circuit may be the PC itself, and the descrambling unit could simply be a software module that receives a length and pointer to, for example, a message in internal or external memory, along with the appropriate key, and cryptographic function identifier.

The function performed by the cryptographic processing in the secure circuit could entail message hashing, signing, and signature authentication using publicly known hashing algorithms and public key cryptography.

In both the ASIC case and the PC case above, a microprocessor is typically used for implementing access control, performing hashing, signature verification, signing and authentication functions. This processing verifies that the secure circuit is indeed authorized to decrypt the data transmission. If authorized, the microprocessor then derives the descrambling key for the data transmission. The secure circuit typically has an internal storage device, e.g., memory, for storing descrambling program information for use by the microprocessor, storage for storing the descrambling key data and state of the decoder, and a scratch-pad memory for storing intermediate calculations and temporary data. The state of the descrambling receiver, e.g., decoder, may indicate, for example, whether the decoder is tuned to a particular channel and the channel identifier. The state of the descrambling receiver may also store whether it is authorized to receive the channel, and whether a program tuned, for example, is subscription, pay-per-view, or video-on-demand.

It would therefore be desirable to make pirate attacks against cryptographic key generators executing with external memory more difficult.

Problem: Inflexibility of Using Internal ROM, and RAM Capacity Issues

For an ASIC, the internal memory used by the IC to store program information may be created from read-only memory (ROM), an erasable programmable read-only memory (EPROM), an electrically erasable programmable read-only memory (EEPROM), Flash memory, or a battery-backed random access memory. Typically, the foundry processes for manufacturing ASICs with the smallest geometries and fastest circuits are developed and characterized for ROM- and RAM-based technology initially. EEPROM and Flash capability come at a later time. Therefore, a performance advantage over other technologies may be obtained by designing the ASIC to use ROM- and RAM-based technology. Also, it is easier for VLSI foundries to build devices with ROM and RAM than with EEPROM and Flash because of their simpler design. Therefore, the designer may realize a lower manufacturing cost with ROM- and RAM-based designs.

Creating an internal memory entirely out of battery-backed RAM is generally impractical because a RAM cell, with its ability to allow reading and writing of data, contains many more gates and is typically a much larger structure than a ROM cell, which only allows reading of data. Therefore, such a RAM memory stores far less programming information than a ROM memory of equal physical size.

However, there are drawbacks to storing the programming information in internal ROM since the entire ASIC must be replaced to change the program information. This may be necessary or desirable, for example, to fix a software problem (e.g., bug), or to provide new or customized features for different customers. To achieve this, a new chip must be manufactured with the change in program information. This can be very costly and time-consuming.

Also, no matter how much storage of any type is built into the secure circuit, e.g., an ASIC, it may be too much or too little for any given application. If the storage is larger than required, the price of the secure circuit is higher than necessary. If the storage is smaller than required, then it is either inadequate for the task, or features must be omitted to make the software fit. Rarely is the size of the storage just right.

Accordingly, it would be desirable to provide an scheme for modifying the capacity of a storage device, e.g., the amount of memory, and for easily and inexpensively updating the program information of a secure circuit such as a cryptographic chip. The system should store the program information in a storage device which is external to the secure circuit and provide for efficient and secure transfer of the program information between the storage device and the secure circuit. The transfer of program information should be fast enough, even over a network, to meet code execution requirements. Moreover, the amount of internal storage, e.g. memory required to make the secure circuit operate should be limited. The system may use a limited amount of quickly accessible internal program information which could boot the secure circuit, monitor error conditions, interpret pseudo-code, or handle real-time processing events. However, this internal program information, if stored in an inflexible form, e.g. ROM or read-only CD-ROM, it cannot be changed as easily as externally stored program information.

Problem: Securing External Storage—Authentication Overhead

In the past, various encryption techniques have been used on bytes and blocks. But pirates have employed a variety of "attacks" to break the security of the system. One attack attempts to get the secure circuit to read the encrypted memory and write it out to a clear area where the program information may be captured and then analyzed. An attack of this type actually employs the decryption circuitry itself to decrypt the program information precluding the need to do more extensive analysis.

Another attack tries to break the security of the application itself, by changing the execution of the application in order to make the secure circuit, in this case, in the descrambling receiver, descramble premium services without paying the appropriate subscription fees. To accomplish these and other attacks, the pirates attempt to modify the contents of the external storage device, e.g., memory. And to accomplish this, one technique used is "trialing," where program information in the external storage device is manipulated in a trial and error approach. The pirate does not know which secret key or keys were used to encrypt the program information, but attempts to manipulate the program information in the external storage device until a useful outcome is obtained.

To prevent these and other attacks from being successful, either authentication, stronger encryption, re-ordering of chain fields, or any combination of the above, may be used.

Authentication may be used to verify the origin of the program information. In a system using authentication, the secure circuit will not process program information which is not accompanied by the correct authentication information. Strong prior art authentication is expensive. However, the amount of authentication information must be sufficiently large to provide an adequate level of security. In conventional memory encryption schemes using byte encryption or block encryption, authentication information would be needed with each byte or block which the chip fetches from the external storage device. For a single byte of program information, several bytes of authentication information would be needed to prevent trialing. In other words, the byte would need to be widened to include the additional authentication information. If an eight bit byte of program information were widened to include only 8 additional bits of authentication information, the authentication information could easily be determined by trialing since, with eight bits per byte, there are only $2^8=256$ possible trialing combinations. To provide a security level comparable to the Data Encryption Standard (DES), 56 bits (seven bytes) might be used to provide $2^{56}=7.2\times10^{16}$ possible combinations of authentication information. The authentication information would thus represent (7/(1+7)) or 87% of the overall storage. This amount of overhead data is very inefficient.

With block encryption, several bytes of data are grouped and authenticated in a block. For example, a block size of 8 data bytes may be used. Then, with eight bytes of authentication information, the overhead is still very high at (7/(7+8)) or 47% of the overall storage. This excessive overhead data can severely affect the cost of the overall system by requiring a significantly larger storage device just to handle the authentication information. This is unacceptable with consumer electronic devices such as hand held games, cellular phones, and television decoders which must be manufactured at the lowest possible cost. In particular, the cost of the storage devices are usually a significant limiting factor. Thus, the amount of authentication information overhead is unacceptably large with existing data authentication schemes.

Accordingly, it would be desirable to have a system which minimizes the amount of authentication information (e.g., check bits) which is required to securely communicate program information.

Problem: Encryption of Program Information Inadequate

Trialing attacks of a single encrypted byte of program information is trivial to perform. Assuming an 8 bit byte again, this requires the trialing of only $2^8$=256 possibilities for the program information to obtain an exact result. For some pirate attacks, however, the ability to simply change program information to something different, is a goal. In this example then, simply the ability to trial a single byte value without influencing other bytes would result in a successful pirate attack.

Trialing attacks of a single encrypted block of program information is a bit more difficult but still manageable. Large general purpose Reduced Instruction Set Computing (RISC) processor, for example, have instructions that are 64 bits long. Assuming and 8 byte block and 8 bits per byte, it is relatively easy for a pirate to alter a block of program information and effect only one instruction.

Even with instruction widths half that size, e.g., 32 bits, only two instructions are affected. So called Complex Instruction Set Computing (CISC) processors are equally at risk for attack. And CISC processors described as "8 bit processors" are not really 8 bits because they typically require the fetching of one, two, or three operands of program information which makes any instruction have between 8 and 32 bits, with an average of about 20 bits, but this depends on the choice of instruction used by the program. Therefore, trialing an 8 byte block of encryption values for so call "8 bit" instructions might only effect three instructions.

Accordingly, it would be desirable to have a more robust encryption algorithm to securely communicate program information.

Problem: Execution, Even Encrypted, is Observable

Even though blocks of program information may be encrypted or authenticated, someone observing the traffic of data on a communications means, e.g. bus or network, can learn about the function and design of the program information. The more information that a pirate might learn about the program information, the more ways that he might have to alter program execution. An internal storage circuit such as a cache may obfuscate some of the function and design by referencing data that was either only decrypted, decrypted and authenticated, or simply authenticated from the internal storage circuit, rather than have to fetch the program information again externally.

A problem arises, however, because the original communication sequence, that which loaded the program information into the cache in the first place, may be observed. A system without a cache is even easier to analyze because recursive code, e.g., loops, can be seen on the external interface. It would be easy to see the same encrypted, encrypted and authenticated, or simply authenticated program information being communicated over and over again. A cache will blind this operation by making the communication internal to the cache and not visible on the communication means. However, a clever pirate might notice that no external communication was occurring and conclude that therefore some sort of internal operation was occurring. In principle, it is not desirable to have a pirate learn anything about the algorithm being executed. This includes the overall structure such as byte to block, block to chain or chain to program information sequence association, sequence of processing such as always executing particular program information on boot-up, and the organization of the program information such as data table organization.

It would therefore be desirable to have techniques for obfuscating the execution of encrypted, authenticated, or any chain of program information. It would be desirable to communicate the program information in a manner which is out-of-sequence from the true execution sequence by the secure circuit. The sequence may be obfuscated within a block, chain, or program information sequence.

That is, it would be desirable to obfuscate the sequencing of the bytes that make up a block, the blocks that make up a chain, and the chains that make up a program information sequence. The sequence permutation may be fixed and yet be different on a byte by byte, block by block, chain by chain, or program information sequence basis. It would be desirable to spread the sequence obfuscation to be of greater depth, that is, greater than a block, for instance, over two blocks or for that matter an entire chain. The same would be desirable for all of the other fields.

Problem: Sequence Permutation Algorithm may be Discovered

Any sequence permutation algorithm implemented in hardware may be discoverable by a pirate probing the VLSI or other analysis. The permutation function may be keyed and be both address and unit dependent. However, this does not preclude a determined pirate from discovering what the key and dependencies are.

It would be therefore also desirable to have a way of making analysis and reverse engineering of the sequence permutation more difficult.

Problem: Underlying Sequence Does not Change—Address Location Always the Same

Even with the sequence permutation, a pirate may observe every communication between the storage device and know which bytes belong to which blocks, and which blocks belong to which chains. That is, a particular address location in the storage device is associated with a particular byte, block, or chain sequence. The address location will always contain the same information. The pirate may not know what the exact positional information is because of the sequence obfuscation, but he knows that its association with the other bytes, blocks or chains is fixed. The pirate does not need to know what the value of the program information stored at a particular location is. The pirate can trial a value at that storage location. The pirate can do this systematically going through all values even though the storage location is accessed at varying times due to the sequence permutation techniques.

It would therefore be desirable therefore, to have a scheme for dynamically changing the address location in the storage device where data representing a particular byte, block, or chain sequence is located in the storage device to prevent someone from systematically trialing code.

Problem: Every Communication is Pertinent

A pirate may observe every communication of program information between the storage device and know that it is encrypted, authenticated, sequence permuted or all of the above.

For additional obfuscation, it would be desirable to communicate "dummy" or not necessarily needed data with the program information communicated.

Problem: Bi-directional Write and Read Required

The storage device can be read-only, but there are many reason why the storage device should also be write-able. Different cryptographic and non-cryptographic yet proprietary applications have varying requirements for data storage.

Modern cryptographic applications often employ public key cryptography, which generally require larger keys than secret key cryptography. The scrambling sender or descrambling receiver may perform some type of cryptographic application which may interface on an open network such as the Internet, which may require the storing of a number of various public keys, e.g., from a Root Authority, or Certificate Authority. Also, with pay television decoders, there are public keys for the access control system and/or the decoder manufacturer. Over time, many more public keys may need to be stored as a result of interacting on the network. Some of these keys are meant to be long lived, and, for example, if the public keys may be 2048, 4096 bits, or larger. Consequently, a large capacity storage device, e.g., large amount of read/write storage may be required for storage of keys and other related information to effect a viable cryptographic application.

The same can be said for many proprietary applications. The trend is to process more and more data. It is desirable to have great flexibility with the type and amount of storage for writing and later retrieval of program information as there is for just reading program information.

Accordingly, it would be desirable to have a secure bi-directional communication between an external storage device and a secure circuit, where this has the flexibility to accommodate growing requirements for additional program information storage without requiring a design change of the secure circuit. Also the security of the overall implementation cannot be diminished.

Problem: Communication with Non-Secure Outside World and Alternative Security Modes The secure circuit may have to interface with display devices, peripherals or computers which do not have a decryption means. This is important where interactivity with a human is involved. For example, if a customer input a Personal Identification Number (PIN) code wrong, it may be necessary for the secure circuit to inform the customer of the problem so that the PIN may be re-entered. This may require communication with the host device of a error condition or of an error message which may be displayed appropriately on a screen. There may be a shortage of pins, communication ports, or buses which may be dedicated to external communication.

The execution of some program information may have reduced execution latency requirements requiring an alternate communication mode other than by chains. Also, the secure circuit may need to inter-operate with other devices with have different security schemes.

It would also be desirable to provide a conditional clear mode whereby no encryption/decryption, authentication generation/verification, or sequence permutation of the program information is performed. This conditional clear mode would not only allow a possible chip debug facility, but also allow the secure circuit to interface, send and receive clear data, with the world at large, such as display devices, other computers, and the like, thereby allowing the communications means to be used for more than the conveyance of program information. This would reduce the number of separate pins, communication ports, and buses used for external communication.

It would also be desirable to switch off the chain encryption/decryption, authentication generation/verification, or sequence permutation of the program information, in favor of a different type of encrypt/decryption, authentication/verification, or sequence permutation that is not based on chains. For example, instead of a chain, byte or block processing may be used.

Problem: Detection of Chain Lengths

A pirate may be able to analyze the execution of the program information to determine what program information belongs with a particular chain. That knowledge could allow a pirate to trial program information in a more selective fashion. In principle, it is a good idea to prevent a potential pirate from learning anything about how the program information is executing.

It would therefore be desirable to communicate blocks of program information with variable chain lengths in random sequence from one chain to the next with no particular consideration being given to the program information being executed.

Problem: Different Latency Requirements

Real-time interrupt subroutines have different execution latency requirements than background or maintenance routines. There is a natural tendency for a designer to make shorter chains for all of the program information to simply handle the faster execution requirements of real-time interrupt subroutines. But reducing chain lengths for all of the program information may unnecessarily increase the storage capacity of the storage device to accommodate the increased amount of authentication information.

It would therefore be desirable to communicate blocks of program information and associated authentication information in block chains, where different chains lengths may be used for communicating different types of program information with different latency requirements. Routines placed in lower address locations could have lower latency, while those in a higher address location of a storage device could have higher latency requirements.

Problem: General Communication/Storage Latency Requirements

While certain routines may have special execution latency considerations, the latency may still be too much for certain applications. Consequently, means must be explored to allow for more efficient communication and storage of program information.

It would be desirable to design certain features into the architecture of the communication means, and secure circuit in order to help reduce program information latency to help speed up execution.

Problem: Authentication/Verification Latency Requirements

While certain routines may have special execution latency considerations, the latency due to authentication/verification may still be too much for certain applications. Consequently, means must be explored to allow for more efficient authentication/verification.

It would therefore be desirable to design certain features into the authentication/verification function to help reduce program information execution latency.

Problem: Encryption/Decryption Latency Requirements

While certain routines may have special execution latency considerations, the latency due to encryption/decryption may still be too much for certain applications. Consequently, means must be explored to allow for more efficient encryption/decryption.

It would be therefore be desirable to design certain features into the encryption/decryption function to help reduce program information execution latency.

The present invention provides a system having the above and other advantages.

SUMMARY OF THE INVENTION

In accordance with the present invention, an apparatus is presented for securely communicating encrypted blocks of program information between a storage device and a secure processing circuit in cipher block chains.

An apparatus is presented for securely communicating authenticated blocks of program information between a storage device and a secure processing circuit in block chains.

An apparatus is presented for securely communicating re-ordered fields of program information between a storage device and a secure processing circuit in chains.

The present invention further provides an apparatus for cryptographically generating a key whereby the key may be used to gain access to a data transmission or the like.

In one aspect of the present invention, an apparatus for securely communicating blocks of program information between a storage device and a secure circuit includes means for providing at least one block of program information including a particular block comprising a plurality of bytes having a first byte sequence.

One block buffer sized to store one block of data is all that is required for a minimal implementation since the data can be processed serially, one block at a time.

Means, such as an address generator, are provide for storing the block(s) of program information in the storage device.

Cipher block chaining is a robust encryption algorithm because a change in one block will cascade changes to other blocks making it difficult for a pirate to effect a simple change to the program information.

Cipher block chaining may be used to both hash and encrypt for privacy. The last clear text block may be exclusive ORed (XORed) on the encrypted authentication block to provide a dependence of the entire cipher block chain on the decryption of the authentication block.

For example, the program information and authentication information may be carried in two or more eight-byte blocks. Block chaining is efficient due to the relatively low overhead of the authentication information relative to the authenticated data. The authentication information is XORed with the last clear data (e.g., program information) block and optionally decrypted and to yield a verification value. The value is compared to a value which is known by the hardware to verify that the authentication data is correct. The value may be different for different chains or it may be fixed for all chains. To provide additional separation between keys, the key used to decrypt the authentication information may be different that that used to decrypt the authenticated information. Also, with each decryption operation the key may be modified with the address to provide address dependency of each block within a chain.

For more robust security, cipher block chaining may be used along with another hashing algorithm. There is no additional latency penalty for doing this since each block must be processed in a serial fashion. When the first block is decrypted it not only is XORed with the cipher text of the second block, but it is also submitted to the authentication circuit. The last block is the authentication bits, and it does not require submission to the authentication circuit, it is simply decrypted and compared to a value held in the hardware.

A first communication path such as a bus is provided to communicate blocks of the program information and authentication information between the external storage device and the one or more block buffers in a chain. One block buffer sized to store one block of data is all that is required for a minimal implementation since the data can be processed serially, one block at a time. The authentication information is read in and verified by the authentication circuit.

The program information is decrypted, if necessary, in a deciphering circuit which is associated with the authentication circuit. Cryptographic key data from an associated storage device may be used for this purpose.

If a pirate changes any data in preceding blocks in the chain for trialing, the computed hash data that is compared with the authentication information will be incorrect, and the resulting verification value will not match. The secure circuit, such as an ASIC or PC, will then know that tampering has occurred and countermeasures may be taken.

There are a number of ways the authentication operation can be implemented. The hashing may be keyed, e.g. using a secret key with the authentication information in-the-clear, or the hashing may not be keyed and the authentication information is encrypted, or for more robust security, the hashing is keyed and the authentication information is encrypted. Different keys may be used to hash and to decrypt. The hashing key may be a secret key, while the authentication information may be encrypted under a public key. The same key used to encrypt the authentication information may be used to encrypt the program information being authenticated. That has the benefit of the authentication information being treated in a similar fashion as the program information. However, using a separate key would add another level of security.

In an alternative embodiment, block encryption is used for privacy. When decrypted, the blocks are authenticated. The authentication technique used can be a hash which might require a strict order of hashing, e.g. block #1 hashed, then block #2 hashed with the output of the hash of block #1, and so on. Known algorithms such as MD5 and SHA may be used for this type of strict hashing.

Although such hashing may be used, the hashing can introduce a latency due to the serial nature of the operation. A simplified hashing function can be provided that performs an XOR of all of the clear blocks. That hash value can be verified with the authentication information. In fact, the authentication information can be XORed as a block along with the program information. This technique improves program information execution latency, which is important for real time operating systems. Here, each block of data can not only be decrypted independently as in Electronic Code Book as called out by FIPS, but also XORed independently while computing the hash for the entire chain. This technique, which is termed "simple block chaining", emphasizes reduction in execution latency.

Detection of illegal op-codes or illegal interpreted code commands may be used as a form of authentication. Upon receipt of an illegal op-code or command, the system can decide how to respond, e.g., reset, increment a counter, or some other action.

The creation of an illegal op-code by a pirate depends on the instruction set of a given processor. Some instruction sets are fully developed and have few, while other instruction sets are reduced and have more undefined or illegal op-codes. If an instruction set, for example, had 20% undefined or illegal op-codes, then that means that a pirate has an 80% chance of randomly creating a legal op-code. This is not to say that the pirate generated a particular op-code rather a legal one. But a random legal op-code other than the intended one could make for a successful pirate attack. For example, this might be the case if simple nullification of the original op-code was the goal. With the odds of 80% in favor of a pirate, this method of simply detecting illegal op-codes leaves much to be desired.

Illegal op-code detection as a form of authentication is more effective with cipher block chaining, because the odds of a pirate creating an illegal op-code are increased as each subsequent block in a particular chain will be affected. For example, if there are sixteen blocks of instructions in a chain then the odds of a pirate being successful if the pirate alters the very first block of the chain is as follows: $(0.8)^{16}=0.028$. The situation has changed, the pirate now has approximately 97% chance of failing. Cipher block chaining is a more robust encryption method for this reason—this implicit authentication through the detection of illegal op-codes. But cipher block chaining is also better because it makes it more difficult for a pirate trialing the encryption of program information to isolate any changes made to a single block thereby increasing the odds of creating unintended op-codes with unwanted side effects.

A problem is that the external storage device stores more than just op-codes. Only op-codes can be verified by the instruction decode circuitry of the CPU. More robust security requires explicit authentication.

Authentication can be performed by either XORing the authentication information with hash of the clear text data blocks to produce a verification value that is subsequently compared to a pre-stored value, or the authentication information can be simply compared to the hashed program information.

The authentication function may optionally hash blocks of program information that were communicated in the clear to XOR with the decrypted authentication information. In order to prevent pirates from creating their own authenticated program information using a known hashing algorithm, a cryptographic key must be used. This can be done two ways—keying the hashing or keying the authentication, or both.

Simple block chaining, an alternative technique which addresses latency problems, uses a singular block encryption of each block of program information. Thus, each block is encrypted and decrypted independently so processing may occur in parallel. Moreover, the entire chain, or group, of blocks is authenticated. One method of hashing is to XOR the program information blocks together and with the authentication information. This can be done all at once.

More complicated hashing may be used as well for more robust security, but these methods may introduce a serial dependence, whereby one block may need to be hashed ahead of another block. Simple block chaining, using the encryption and authentication process described above, reduces the authentication bit overhead, as with cipher block chaining, but can avoid the latency problems of cipher block chaining when parallel deciphering circuitry is used. If only a single block buffer is used, then the latency is about the same for cipher block chaining and simple block chaining, the only difference being that the output of one block decryption is XORed with the output of the next decryption (with simple block chaining) rather than the input to the next decryption (with cipher block chaining).

The simple block chaining method, decrypting and authenticating using the XOR of clear blocks, suffers from the problem that any of the blocks may be re-ordered out of sequence and the authentication will still check out. So while decryption and authentication operations may be done in parallel, a potential problem has been introduced. Encryption, with address dependency, should be used with simple block chaining using the simple XOR hashing function.

That is, the key used with each block in the chain would be different with the key being a function of the address of the specific block. If DES encryption were used, changing any of the program information of a block for trialing would cause approximately half of the bits in the decrypted output to change, causing the authentication verification to not check out. Without knowledge of the key, it would be difficult for a would be pirate to find the proper authentication information to compensate.

In an attempt to reduce program information execution latency, the authentication may be performed on the cipher text data using either a keyed hash or encryption of the authentication information. Decryption and authentication may operate simultaneously, and not authentication after encryption. For simple block chaining, this has a problem that address-dependent decryption will not have been performed on the program information, possibly making it vulnerable to being submitted to the decryptor out-of-sequence.

Random sequence permutation of fields within a chain during the communication between the external storage device and the secure circuit may be used. Means, such as a data bus or network, are provided for communicating the program information with the secure circuit.

Means associated with the secure circuit are provided to re-order the re-ordered fields of the chain to recover the fields in the first field sequence. A chain of program information may be re-ordered into two or more fields, re-ordering may be provided.

That is, the blocks may be communicated between the external storage device and the block buffers in a random, non-sequential sequence that does not reflect the true execution sequence of the blocks by the secure circuit. Moreover, re-ordering may occur for bytes within one or more blocks, or for entire chains. Any field may be re-ordered.

Such non-sequential transmission is effective in deterring a pirate from ascertaining the program information structure, sequence, and organization executing in the secure circuit. By re-ordering any field with a chain or chains, or the relative position of entire chains in a program information sequence or multiple program information sequences, a pirate is deterred from detecting information regarding the execution sequence of the program information in the processing circuit. With re-ordering, a pirate may then be deterred from easily learning the correct clear text or cipher text of the program information making certain cryptographic attacks more difficult to accomplish. Preferably, the program information is encrypted for increased difficulty of analysis.

An alternative embodiment of this apparatus communicates the blocks of program information from the storage device to the secure circuit while substantially randomly re-ordering the fields of a program information sequence. A new sequence is used to communicate the fields from the secure circuit back out to the storage device thereby changing the field associated with a particular storage location in the storage device. Means are provided internally to the secure circuit to store the new "true" sequence of the program information in the storage device.

The new underlying sequence order for the fields of a program information sequence are then stored in the secure device so that futures communications to the same blocks will allow the correct re-ordering based on the new sequence in the secure circuit. Means, such as a data bus or network, are provided for communicating the program information with the secure processing circuit.

While the bytes may be re-ordered when communicated between the storage device and secure circuit using the sequence re-ordering techniques above, each byte of program information is still associated with a particular storage location. For example, the first byte of the first block of the first chain of a program information sequence is always located a particular storage location even though the pirate may have problems ascertain that in fact it was the first byte of the first block because of the re-ordering. The pirate may then nonetheless trial the value at that particular storage location (e.g., address) in a systematic and organized way.

Changing the underlying storage location of data in the storage device, prevents a pirate from trialing the program information stored in a particular location in the storage device. By dynamically changing the program information location in a storage device after each use, a pirate trialing program information at a particular location in the storage device will not be dealing with precisely the same program information each time. The attack therefore becomes intractable.

In a further aspect of the present invention, the data sub-fields, bytes, blocks, chains and program information sequences may be fixed and not random. The sequence may be different for each byte, block, chain or program information sequence accessed. This is a permutation that is performed differently on appropriate fields on the incoming program information. Advantageously, this permutation function can be easily implemented in hardware since it is not randomized.

In a particular implementation, the secure circuit uses program information for generating a cryptographic key.

The program information is encrypted using cipher block chaining, and optionally authenticated and/or re-ordered. In another embodiment, the program information is authenticated and optionally encrypted and/or re-ordered using block chaining. In another embodiment, the program information is authenticated and optionally encrypted and/or re-ordered using block chaining.

The key may be used in software to decrypt or descramble a data transmission. By authenticating the instructions, a pirate is deterred from providing phony program information to the secure circuit descrambling the data transmission.

In another aspect of the present invention, a secure circuit uses program information for generating a cryptographic key. The key may be used to descramble a data transmission in hardware. Depending on the partitioning of the secure circuit, the descrambling may be done internally or externally.

The key may be generated and handed to a software module to descramble the data transmission. The software module may be internal to the secure circuit or external to the secure circuit.

In both instances above, the secure circuit, may consist of an integrated circuit (IC), having an authentication circuit, a central processing unit (CPU), and one or more block buffers which are adapted to store one or more blocks of program information.

The external storage device may be a flash memory, an erasable programmable read-only memory (EPROM), an electrically erasable programmable read-only memory (EEPROM), a battery-backed random access memory (RAM), RAM, or a combination of the above. It may also be a hard disk drive, or CD-ROM or any type of mass storage device. The external storage device also stores authentication information (e.g., check bits) for authenticating the program information when it is received in the secure circuit. In some implementations, it is desirable for the contents of the storage device to be copied to a faster storage device such as synchronous dynamic memory so that the secure circuit can fetch program information from the faster storage device, e.g., dynamic memory, rather than the slower storage device with its associated latencies. For example, a network computer may copy program information from the server over the network. The faster storage device may be local, while the slower storage may be remote, in the network computer case, accessed over the network.

To reduce overall latency of execution of real-time executing code, the first communication path may have a sufficient bandwidth so that two or more of the strings, one or more blocks, or one or more chains can be communicated to the block buffers substantially at the same time.

The program information bus is typically not wider than the instruction width because there is a bottleneck problem. The CPU is only executing at a particular rate. The program information would have to be stored somewhere. However, when there is latency associate with other processing—encryption or authentication—this can help to reduce overall latency.

For example, the secure circuit may read more than one block of program information essentially concurrently, where more than one block buffer is used to store the additional blocks, e.g., one buffer per block. In the secure circuit, the authentication circuit receives the program information and authentication information from the one or more block buffers for use in authenticating the program information. In a second communication path in the IC, the authenticated program information from the authentication circuit is provided to the CPU to be executed to thereby decrypt the scrambled data transmission. The program information may include a plurality of strings of instructions, such as lines of computer code, or related data sequences, which are to be processed in succession by the CPU.

A cache may be arranged in the second communication path to temporarily store the authenticated program information before they are provided to the CPU. The cache may store at least one of the strings of program information so that at least two of the strings of program information may be provided to the CPU substantially concurrently (e.g., the stored string and the last authenticated and deciphered string). In this manner, the program information is efficiently communicated to the CPU. The advantage of a cache is that the CPU may fetch already authenticated program information from the cache rather than using the external storage device communication means, e.g., bus or network, which involves various latencies.

When a first chain and a subsequent second chain are communicated from the external storage device to the one or more block buffers, the authentication circuit authenticates the first and second cipher block chains to provide corresponding authenticated program information. Additionally, the CPU may process at least a portion of the authenticated program information from the first chain while the authentication circuit is authenticating at least a portion of the program information of the second chain. Deciphering of the program information when required may similarly be performed in an overlapping manner.

An alternative embodiment of this apparatus communicates the fields of program information between the storage device and the secure circuit while communicating fields that are not used by the immediate, e.g. current or next, program information sequences processed by the secure circuit. This obfuscation technique uses dummy fields of data that may be simply chaff, e.g., never used by the secure circuit during any program information execution, or they may be part of other program information sequences that are simply not currently being processed between the secure circuit and the storage device. Means associated with the secure circuit are provided to eliminate the dummy bytes of the particular blocks to recover the bytes in the first byte sequence, and subsequent byte sequences of the remaining blocks. The dummy bytes may optionally be used during decryption and/or authentication prior to elimination after being received by the secure circuit. Additionally, blocks, and chains that may be eliminated in the same way are provided.

Cipher block chaining or simple block chaining as described herein may be used to both hash and encrypt for privacy. For example, the program information and authentication information may be carried in two or more eight-byte blocks. Block chaining is efficient due to the relatively low overhead of the authentication information relative to the authenticated data. The authentication information is XORed with the last clear data (e.g., program information) block and optionally decrypted and to yield a verification value. The value is compared to a value which is known by the hardware to verify that the authentication data is correct. The value may be different for different chains or it may be fixed for all chains.

Using cipher block chaining to both encrypt and hash, is a way to reduce the amount of hardware associated with the security function. Only one buffer is needed as all blocks by necessity are processed in a serial fashion. The XOR function is more robust than that done in simple block chaining because it is difficult to make a change in one block and be able to compensate for it by changing an other block. Since the XOR is done prior to a decryption step, it is more difficult to manipulate a block to cancel any change made. However, serial processing is required.

DETAILED DESCRIPTION OF THE INVENTION

An apparatus is presented for a secure processor. The preferred embodiment emphasizes security.

Encrypted, authenticated, and sequence-permuted blocks of program information and dummy data are securely communicated between an external memory and a cryptographic ASIC in cipher block chains. Processing of the program information allows the ASIC to derive a key which is used to decrypt digital packets of video and audio for subscription television.

Figure 1:
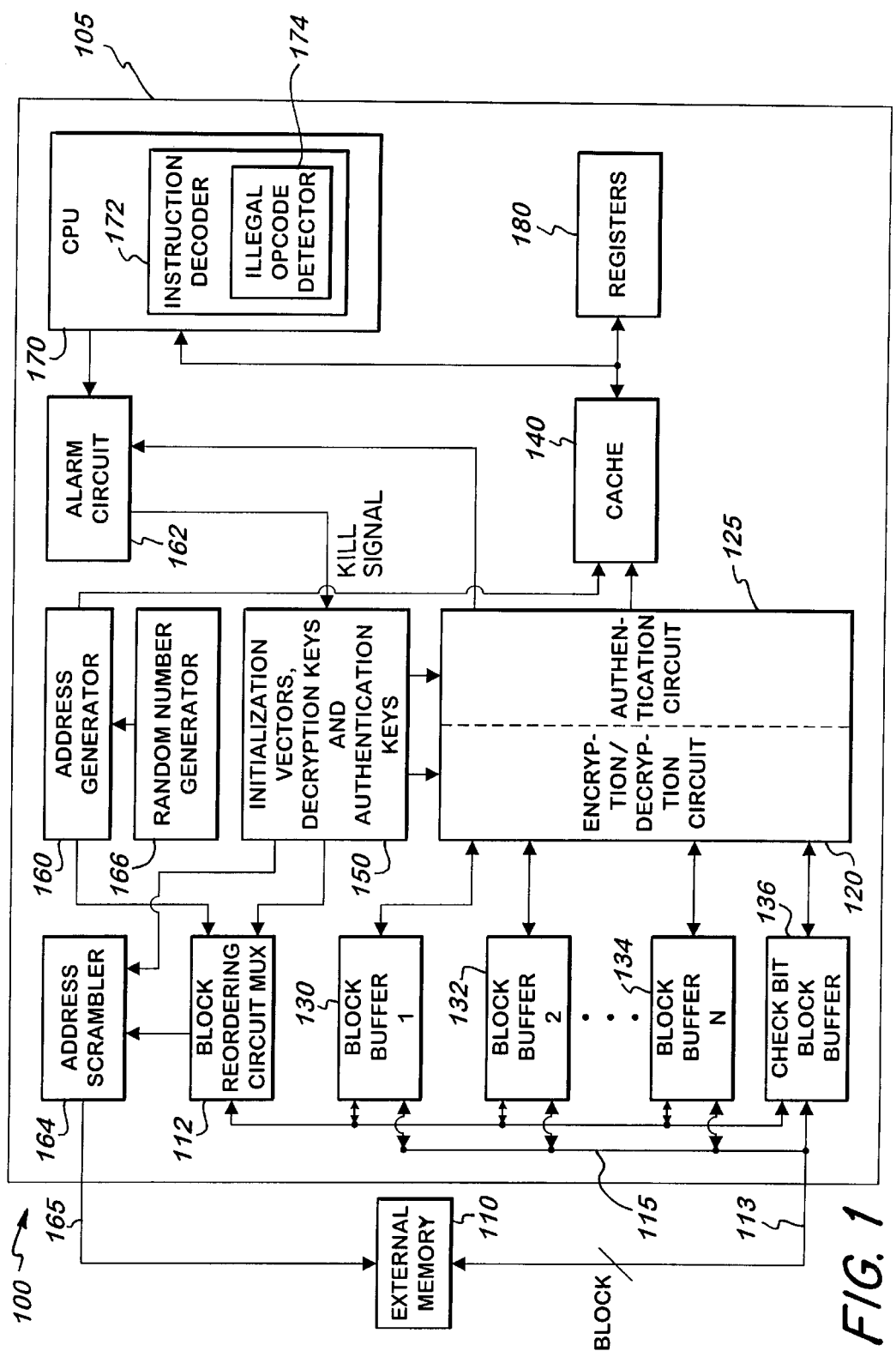
FIG. 1 is a schematic diagram of a cryptographic key generator/descrambling receiver apparatus in accordance with the present invention.

FIG. 1 is a schematic diagram of a cryptographic key generator/descrambling receiver apparatus in accordance with the present invention. The descrambling receiver, shown generally at 100, includes a secure circuit, e.g., an integrated circuit (IC) 105 such as an ASIC, and a storage device, e.g., memory 110, which is external to the ASIC 105. The memory 110 is external to the ASIC 105 since the memory 110 is not embedded within the ASIC package. For example, the memory 110 and ASIC 105 may be provided as separate packages on a decoder motherboard.

In either case, the memory 110, can be increased or reduced by removing and replacing the memory IC, without interfering with or modifying the secure circuit 105. Additionally, new program information such as patch code may be downloaded to the external memory 110, via a telephone line, satellite link, or cable television link, for example. Alternatively, the program information could be installed locally at the descrambling receiver such as via a smart card, or either connected by a socket or soldered to the same board. Or, the memory 110, itself could be located in a smart card, in which case a new smart card could be provided at a relatively low cost to upgrade a decoder. Advantageously, this arrangement provides substantial benefits by allowing the program information (e.g., software or firmware) which is stored in the external storage device 110, to be easily upgraded or modified to provide new features or to fix software problems.

For example, the external storage device 110 can be easily replaced or modified to provide customized features for businesses or individuals, or to provide specific features to groups according to factors such as demographic profile, geographical location, time zone, and the like.

In contrast, if the memory 110 were in ROM and internal to the ASIC 105, the ASIC would have to be replaced altogether, thereby resulting in significant costs and delays. The ASIC may be built using advanced VLSI processes that use RAM and ROM technology to achieve high processing and bit transfer rates not only for the transfer of program information between the ASIC and the external memory, but for internal execution out of the cache, and for the descrambling of the digital packets of video and audio. The ASIC created out of RAM and ROM technology can decrypt a higher bit rate of packetized data than an ASIC created out of alternative technologies. The external memory thus provides the ASIC with greater flexibility.

The external storage device 110 may be a flash memory, an erasable programmable read-only memory (EPROM), an electrically erasable PROM (EEPROM), or a battery-backed volatile memory such as a random access memory (RAM). Alternatively, a conventional read-only memory (ROM) may be used.

An EPROM allows the programming in the memory to be reversed by exposure to intense ultraviolet light. New code may be easily stored in the EPROM in a process known as re-burning. An EEPROM is alterable by using a large electric current to reset the internal memory cells. By using EEPROM or battery backed RAM, the external memory may also be used to store short term and long term data. The memory space could also be partitioned to provide different physical devices so that different memory types may be used together. On power-up, the non-volatile memory may be copied to much faster memory such as synchronous dynamic memory. This can reduce latency in the read/write operations of the external memory.

The external storage device 110 may be encrypted using cipher block chains, or using simple block chains, may be authenticated and, optionally, encrypted. The program information can be used by the ASIC 105 to decode a scrambled data transmission. The program information may comprise lines (e.g., strings) of code which are to be executed by a central processing unit (CPU) 170 in the ASIC 105. Each line refers to an executable command or data used by the program. The code may conform to a reduced instruction set computer (RISC) architecture, where each line of code can be executed in a single chip clock cycle.

The program information is processed using Cipher Block Chaining. The block encryption method is triple DES. Three Keys are available for use. One key is used with the high order address lines. Another key is used with the low order address lines. This provides address-dependent decryption. The third key may be unit-dependent.

The hashing algorithm can use double feed-forward hash (DFFH), for example, as described in U.S. Pat. No. 5,754,659, issued May 19, 1998, entitled "Generation of Cryptographic Signatures Using Hash Keys". The hash is keyed. The key may be an XOR of the address and unit key to provide both address- and unit-dependence to the authentication. Different hashing algorithms may be used whereby the keys could be appended together rather than XORed.

In the preferred embodiment, op-codes generated are processed by an instruction decoder 172. Illegal op-codes can be flagged by an illegal op-code detector 174 in the instruction decoder coder 172, with the appropriate action taken. For example, the CPU 170 may send a signal to an alarm circuit 162, which in turn sends a kill (erase) signal to a storage device 150 which may store initialization vectors, decryption keys, and authentication keys.

With cipher block chaining, any trialing of program information, will cause every subsequent block to decrypt differently.

Furthermore, the address lines of the external storage device may be scrambled such that sequential blocks of the program information are stored non-sequentially. That is, the bytes, which may each include eight bits, for example, can be stored in non-sequential address locations of the storage. Thus, the external storage device 110 is said to be a scrambled memory. A key may be used here as well. A key may be different on a group or unit basis.

The storage device 110 also stores authentication information for use in securely communicating the program information to block buffers 130, 132 and 134 of the ASIC 105 via a bus 115. The authentication information, also known as check bits, is communicated to a check bit block buffer 136 of the ASIC 105.

Authentication information is data that is appended to a message, e.g., chain of program information, to enable a receiver to verify that the message should be accepted as authentic. The authentication information is a function of the message (e.g., chain) contents, such as when a hash value or cryptographic checksum is used. A hash value is a fixed length value which is obtained by mapping a chain of data of any length with a public function. In the preferred embodiment, the hashing is keyed, and the authentication information is encrypted under a different key.

The program information of the external storage device 110 is communicated via a bus 115 to one or a number N of block buffers, including, for example, block buffers 130, 132 and 134. While a plurality of block buffers are shown, a minimum of one is required.

The encryption/decryption circuit 120 is provided to encrypt or decrypt the blocks. The circuit 120 may also provide enciphering, for example, when clear text data is received by the block buffers or other source, and it is desired to encrypt the clear text data. The enciphered data can subsequently be transmitted via the buffers to the external storage device.

An authentication circuit 125 hashes the clear text blocks of program information using, for example, the above-mentioned DFFH function. The authentication can be perform in a serial fashion as the blocks are decrypted. When block 1 is decrypted, it can be hashed. When block 2 is decrypted, it can be hashed with the output of the hash of the first block, on so on. The hashing of the data is keyed such that only knowledge of a secret or private key can generate the correct hash. Alternatively, as mentioned above, decryption occurs for authentication information, e.g., check bits, that, when XORed with the authenticated data (e.g., program information), results in a known value that may be verified by the hardware. The authentication circuit 125 and encryption/decryption circuit 120 can communicate with one another, and may share common circuitry.

Cipher block chaining may be used for the block chain which is communicated from the external storage device to the secure circuit 105. Cipher block chaining is discussed in W. Stallings, *Network and Internetwork Security*, IEEE Press, Englewood Cliffs, N.J., U.S.A., pp. 59–61, 1995, incorporated herein by reference. Cipher block chaining can be used for both encryption and hashing, but in a preferred embodiment, it is used simply for robust encryption. A separate hashing function is used. The block encryption algorithm used with cipher block chaining is triple DES.

Chains lengths can vary between 16 and 32 blocks. Chain lengths are varied on a chain by chain basis according to key and address parameters.

The sequence order that the blocks are communicated between the memory and the ASIC is random. A random number generator associated with the address generator accessed the proper storage locations of the blocks in memory.

Authentication information is sent as one of the 16 to 32 blocks communicated. It can be communicated in any sequence. When decrypted, it is compared with the hash value.

For example, N=16 blocks may be used in the cipher block chain, with each block having eight bytes of data. With cipher block chaining, each encrypted block of data depends on the clear text data of the current block, as well as the clear text data of all preceding blocks. Block chaining enhances security since the same clear text input will yield different encrypted data depending on the other clear text blocks. Additionally, the overhead data which is allocated to the authentication information is significantly reduced. If one of the 16 blocks is devoted to authentication information, then this represents only $1/16=0.0625$ or 6.25% of the program information. If N=32, then the figure would be $1/32=0.03125$ or 3.13%. In the preferred embodiment, the chain size can vary between 16 and 32, so on average the figure would be $1/24=0.0417$ or 4.17%. That is, only 4.17% of the program information is authentication information.

This could vary if, for example, two blocks instead of one block of authentication information were provided. There are many possibilities. But, chaining dramatically lowers the required storage capacity needed just for authentication.

Chaining also allows the use of smaller memory components, which greatly reduces the cost of the system, and/or increases system throughput since the amount of authentication information which is accessed from the storage device is reduced. Cipher block chaining is also discussed below in connection with FIGS. 2 and 3.

A potential disadvantage of cipher block chaining is the latency in instruction execution when a new code segment which has not been decrypted, and authenticated, ahead of time and, perhaps, stored in the cache, needs to be accessed. The blocks must be decrypted serially since it is not possible to begin decrypting a block until the previous block has been decrypted.

More sophisticated hashing functions such as message digest (MD) 5, secure hashing algorithm (SHA), and even cipher block chaining could be used. DFFH was chosen because it is DES based. It is possible to use the same hardware that is doing the decryption to also do the authentication. The inputs to the DES engine can be controlled to maximize use of the hardware. Although one-way functions are desirable, they are not mandatory since, if the authentication algorithm uses a secret key, a one-way function is not that much better than a reversible algorithm such as cipher block chaining since any one with knowledge of the secret key will be able to compute the appropriate authentication information to go along with any program information that may be provided. Authentication using public key cryptography is better because knowledge of the secure circuit's private decryption key does not allow a pirate to know how to encrypt the hash in the first place. The public encryption key must be known.

With either scheme, the bus 115 may be sized to have a bandwidth which allows at least two lines of instructions, or grouped program information, to be carried at once. Alternatively, the bus 115 may be sized to carry one full block (e.g., eight bytes) of the chain, or even two or more full blocks. The bus 115 can also be sized to carry one or more entire chains at once.

A sequence of blocks which are either authenticated and, optionally, encrypted instructions, e.g., blocks $B_1, B_2, \ldots, B_{N-1}$, or cipher block encrypted, and optionally authenticated. Encrypted blocks are used with cipher block chaining, but are optional with simple block chaining. The authentication information is included in the communication of the program information in a block of check bits, e.g., block $B_N$.

The savings in overhead data with cipher block chaining or simple block chaining while maintaining a desired security level can be seen as follows. The average number of trials to break the authentication is $2^{n-1}$, where the authentication is n bits in length. To provide a sufficient level of security, a authentication should reflect to some degree the length of the key or keys used to encrypt the instructions. Otherwise, the pirates will attack the weakest component of the system, which could be the authentication information itself. That is, instead of trialing the key to discover what key the program information was encrypted under, a pirate can trial the authentication information and cause the CPU to process synthesized program information. If the encryption uses a key of at least seven bytes for DES, then preferably seven or eight bytes, should be used for the authentication information. For example, with authentication information which is seven bytes in length (e.g., n=56 bits in length), $2^{55}$ trials are required on average, which is similar in difficulty to breaking the DES key.

When an eight byte block of authentication information is appended to an eight byte message block, the overhead of the authentication information is 50% (e.g., 8/(8+8)). However, when block chaining is used in accordance with the present invention, and a seven byte block is appended to a chain of 16 to 32 eight-byte blocks, for example, the overhead as we discussed above is only about 4.17%, with robust security. Accordingly, block chaining provides a substantial reduction in authentication information overhead while maintaining a desired security level.

In a further aspect of the present invention, re-ordering of the chain which is communicated from the external storage device to the ASIC 105 is provided. This re-ordering is used in addition to the scrambled storage of the blocks in the storage device, discussed below, but it is possible to use the re-ordering by itself. By randomly re-ordering the blocks in the chain, a pirate is deterred from detecting information regarding the execution sequence of the program information in the processing circuit. As with byte- and chain-level re-ordering, block re-ordering can be done randomly such that repeated execution of the same code will fetch data from the external memory in difference sequences each time. For example, with byte level re-ordering, if there are eight bytes per block, there are 8!=40,320 different sequences in which the bytes may be ordered. Similarly, for block reordering, if there are sixteen blocks per chain, there are $16!=2.09 \times 10^{13}$ different sequences in which the blocks may be ordered. For chain reordering, if there are 4 chains per program information sequence, there are 4!=24 different sequences in which the chains may be ordered. And, it is possible to use all three together. The total number of possible permutations would then be $40,320 \times 2.09 \times 10^{13} 24 = 2.02 \times 10^{19}$.

It is important to realize that any field can be the basis for re-ordering and that bytes, blocks and chains are arbitrary units for bits. The fields being re-ordered could be nibbles. Also, bytes do not have to be eight bits, nor blocks 8 bytes, etc.

With this in mind, the re-ordering operation could allow bytes to be re-ordered across two or more blocks, blocks across two or more chains, and chains across two or more program information sequences. Here, we get a different result. For example, with byte level re-ordering, if there are eight bytes per block reordered over two blocks, there are $16!=2.09 \times 10^{13}$ different sequences in which the bytes may be ordered.

If cipher block chaining is used in conjunction with re-ordering, where serial processing of the blocks is required, multiple block buffers are needed to store all the related fields prior to deciphering. Moreover, as discussed further in connection with FIG. 6, if re-ordering occurred across two or more chains, then two or more chain's worth of block buffers would be needed. Re-ordering across program information sequences would require even more block buffers. Deciphering may be delayed until the fields associated the last block sequence are read because, when re-ordered internally, the last block read may be the first block of the chain sequence.

With cipher block chaining, security is emphasized. However, simple block chaining, as described with the XOR hashing function in FIG. 3, avoids latency problems and can be used with chain, block, byte or any field re-ordering. Regardless of the chain, block, byte or field order, all of the bytes in a block are available to perform the authentication. Additionally, when decryption is required, each block is decrypted independently.

Address data provided to the external storage device may randomly select fields, bytes, blocks, or chains for communication to the ASIC 105. A block reordering circuit multiplexer 112 may be provided which communicates with the bus 115 to reverse the re-ordering as necessary for the encryption/decryption circuit 120 and authentication circuit 125 to perform their functions. The block reordering circuit multiplexer 112, address generator 160, and address scrambler 164 may communicate with each other, and with the CPU 170 as required, to coordinate the re-ordering steps. The address generator 160 may be responsive to a random number generator 166. The random number generator 166 can provide random or pseudo-random sequence permutations for the fields of a chain or chains which need not conform to any algorithm embodied in the hardware.

Chain, block, byte, and field level sequence scrambling is generally applicable to virtually any scheme where blocks of data are communicated from a memory, to a secure circuit for processing. As mentioned above, scrambling the order of bytes or sub-fields within each block does not affect decryption latency since all of the bytes must be assembled before authentication and decryption can begin. However, the re-ordering confuses a pirate as to which cipher text corresponds to which instruction or other data block. It also confuses a pirate as to the structure, sequence, and organization of the program information in the storage device.

In the preferred embodiment, an entire eight byte block is read in by the secure circuit 105, the order that the first byte is read relative to other bytes would change from block to block, and could change randomly each time the storage device is accessed. But when re-arranged within the secure circuit, there is only one proper sequence for a block that must undergo decryption. For cipher block chaining, this has the advantage of not requiring more than one block buffer, since it has the bytes of an individual block being re-ordered, but it narrows the obfuscation to an even smaller period of time. The external storage device can be rearranged or sorted prior to loading the individual bytes into the block buffer.

In a further aspect of the present invention, the blocks of a chains are written back out into the storage device in a new pattern. Each random reading of the storage device is followed by a corresponding writing of the data back out in a different random sequence. Associated with each chain is a memory device which stores the current underlying ordering sequence of the chain. The re-ordering can be random.

Dummy data may also be communicated between the storage device 110 and the secure circuit 105. The dummy data may be chaff which is stored by the storage device 110. This is data which never gets processed by the secure circuit, but it may be optionally used as filler, and be decrypted and optionally authenticated by the secure circuit. It is easy to generate chaff. One simply performs a branching or jump operation immediately preceding the chaff. If no calls, branches, or jumps are ever made to that location where the chaff is, then that chaff will never be executed. The dummy data may be real program information for other chains and instruction sequences that may be accessed at a later time and under different situations. Like chaff, this data may be optionally used as filler, and be decrypted and optionally authenticated with the other program information. But this data does not get processed by the secure circuit. The superfluous data confuses the pirate attempting to analyze the authenticated program information.

One of the best ways to communicate dummy data is through variable length chains. The actual number of blocks communicated could remain the same while the number of dummy blocks changed. With re-ordering of blocks it would be hard for a pirate to determine which blocks might be the dummy ones. The dummy blocks in the preferred embodiment would actually be data which is never processed.

The external storage device 110 may be encrypted such that the blocks of program information, and authentication information are stored in non-sequential address location in the storage device. It would be preferable to include the high order address bits in encryption of the storage device so that any block of program information may be located anywhere in the memory space. Substitution tables (S-tables) can be used to eliminate regularity and add non-linearity in the address encryption.

Specifically, the authenticated block chained external storage device is encrypted so that the execution of the cryptographic code can be concealed from a pirate who is observing the storage device accesses on the communication path 113. A pirate may be prevented from learning about the proprietary algorithms being executed. Encrypting may therefore prevent a pirate from ascertaining the contents of the storage device, and from systematically attacking the secure circuit 105 through other means with the hardware. Encryption of the storage device prevents the pirate from knowing exactly which encrypted program information is the likely target for attack. By knowing exactly which program information could make the system vulnerable to a security breach, the pirate might focus on upsetting the processing of that program information.

If address scrambling and data encryption and authentication were used alone, e.g., without data re-ordering, only one block buffer is required in a minimal implementation.

Scrambling can be accomplished by using an address generator which is associated with the secure circuit 105 to provide addressing information to the external storage device. A number, possibly a random one, may be provided to change the sequence in which the program information is communicated. The sequence information is used to multiplex the appropriate field, byte or block buffer to communicate with the appropriate byte or block at the right time. Individual strings of sub-fields, bytes or blocks of data from the external storage device are then transferred to the block buffers in a desired sequence according to the addressing information. The addressing information is provided to the authentication and deciphering circuits to allow these circuits to descramble the data to function accordingly.

Various block encryption algorithms, such as triple DES, may be used. Furthermore, the scrambling algorithm may use the same substitution box (S-box) tables as DES but with fewer rounds. The number of rounds may be selectable for different applications, such that an application requiring less security uses fewer rounds, while one requiring more security might use the entire sixteen rounds that DES calls out. Reducing the number of rounds reduces the latency of the decryption operation.

Address-dependent decryption and authentication of the program information can prevent a pirate from moving otherwise properly encrypted and authenticated block chains around in storage device to get the decoder to process program information out of sequence. Such out-of-sequence processing could cause the descrambling receiver to improperly grant access to and descramble a data transmission.

If possible, the key used for encryption and decryption and/or authentication should have both address dependent scrambling and unit key dependence. The unit key is a key that is unique to each decoder and may depend on, for example, the decoder serial number which is provided at the time of manufacture. Thus, it is desirable for the key to depend on individual units, or groups of individual units. Otherwise, it may be possible for a pirate to read the scrambled key data in the external storage device from one unit, and then place that same scrambled key into another unit's external storage device. This might be a way for a pirate to clone authorization to services between units and must be prevented.

Address dependent scrambling and unit key dependence also prevents knowledge of a key used to authenticate and/or scramble a block of program information in one decoder to be used in another decoder. For example, without unit dependence, if this secret key is discovered through VLSI probing, for instance, then it can be used to correctly authenticate and decrypt program information for other decoders. In other words, if a key or keys were useful for more than one unit, a pirate might then be able to use the key or keys obtained from one unit to either encrypt, encrypt and authenticate, or authenticate program information for another unit. To achieve unit-dependent scrambling, a download process using an optional on-chip enciphering circuit may be used to load external flash, EPROM, battery-backed RAM, or mass storage device at unit creation time. This enciphering circuit may be the same one used to allow for bi-directional read/write capability between the secure circuit and the storage device. An alternative would be to have these external storage devices loaded by the configuration system at unit creation time using knowledge of the unit's secret or private key or keys.

Figure 2:
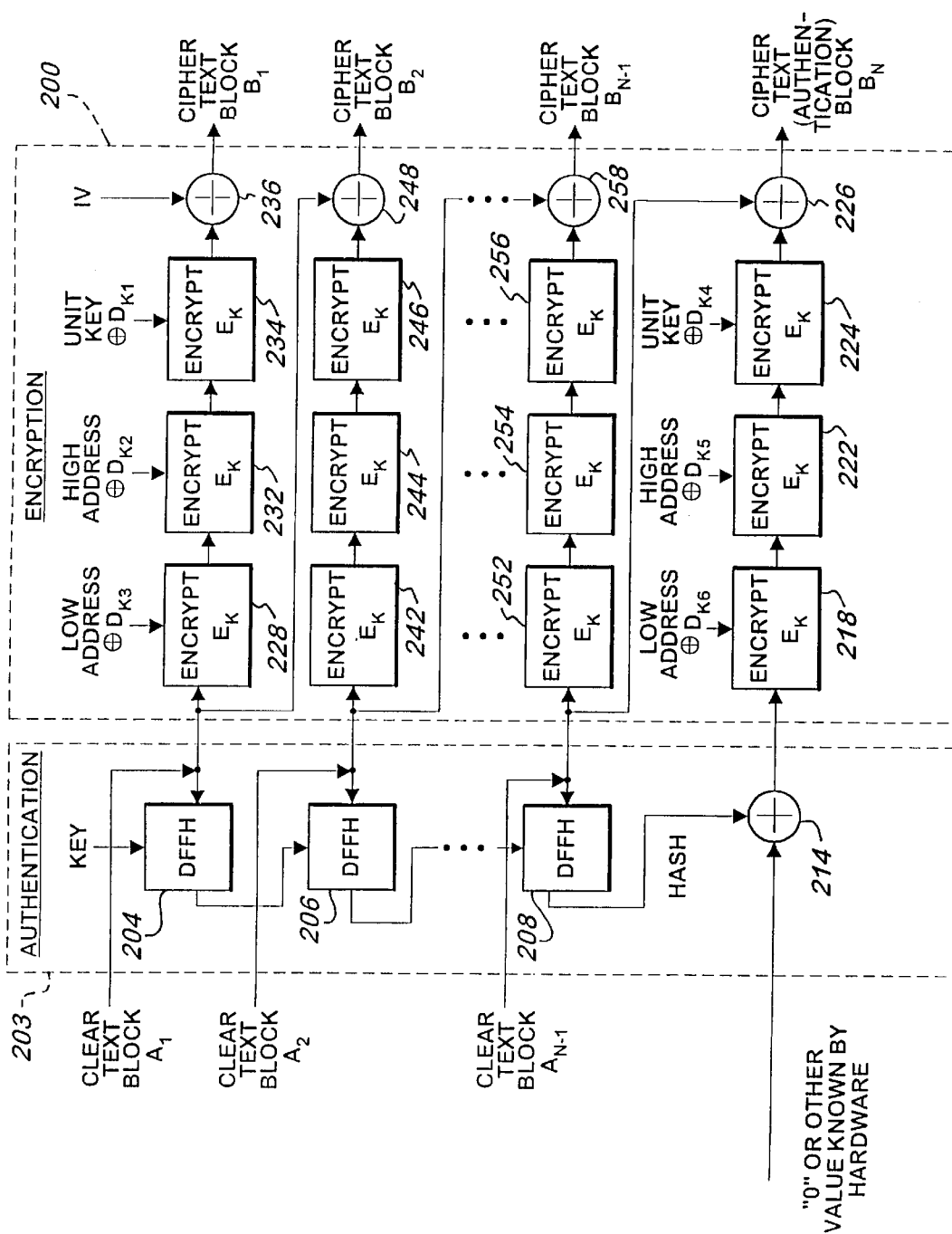
FIG. 2 is a schematic representation of a cipher block chaining encryption scheme in accordance with the present invention.

FIG. 2 is a schematic representation of a cipher block chaining encryption scheme in accordance with the present invention. Blocks of clear text program information are converted to a chain comprising blocks of encrypted program information which includes the authentication information. In the example shown, each encrypted block of program information depends on the clear text program information of the current block as well as the clear text program information of a previous block.

An authentication circuit 203 and an encryption circuit 200 are shown. Specifically, the authentication circuit 203 includes hashing functions 204, 206 and 208 and an adder 214. Functions 204, 206 and 208 may use the DFFH function discussed above or virtually any hashing function. A key is successively hashed at the functions 204, 206 and 208 to provide a hash value to the adder 214. The adder 214 also receives a zero or other value which is known by the hardware to provide an output value to the encryption circuit 200, which may include a triple DES encrypt function represented by encrypt functions 218, 222 and 224.

Encrypt function 218 receives a secret key which is an XOR of low order address bits and a key $D_{K6}$, while the encrypt function 222 receives a secret key which is an XOR of high order address bits and a key $D_{K5}$, and the encrypt function 224 receives a secret key which is an XOR of a unit key and a key $D_{K6}$. An adder 226 receives an output from the encrypt function 224 along with the clear text block $A_{N-1}$ and provides the cipher text authentication block $B_N$. The adder 226 essentially hashes the clear text data.

Clear text blocks $A_1, \ldots, A_{N-1}$, which may include program information for descrambling a data transmission, are received by the respective triple-key encryption functions, and are also provided for XORing of the subsequent cipher text block. For example, $A_1$ is processed by encrypt functions 228, 232 and 234, which are each responsive to keys as shown. An adder 236 receives the output from the encrypt function 234 along with an initialization vector (IV) to provide the cipher text block $B_1$.

$A_2$ is processed by encrypt functions 242, 244 and 246, which are each responsive to keys as shown. An adder 248 receives the output from the encrypt function 246 along with the clear text block $A_1$ to provide the cipher text block $B_2$. Thus, $B_2$ is a function of both $A_1$ and $A_2$. Likewise, $A_{N-1}$ is processed by encrypt functions 252, 254 and 256, which are each responsive to keys as shown. An adder 258 receives the output from the encrypt function 256 along with the clear text block $A_{N-2}$ to provide the cipher text block $B_{N-1}$.

The IV may be zero, or a function of the address data or unit key which is provided to the block re-ordering circuit 112 or other randomizing function. A block size of eight bytes is assumed for this example. Moreover, although triple DES is illustrated using three different keys for each DES operation, fewer or more keys may be used. More keys may be introduced into a DES operation by splitting up the rounds to use different keys instead of a single key.

Additional keys may be used for the encryption functions, and additional and/or alternative encryption steps may be taken. Preferably, each of the cipher text block encrypt functions use the same encryption algorithm, although this is not required.

The N encrypted blocks, $B_1$ through $B_N$, may be provided to a further encrypt function, such as block re-ordering circuit mux 112 of FIG. 1, which performs a block-wise scrambling of the N blocks according to an address data signal. For example, with N=8 blocks, the blocks may be stored in sequential addresses of the external storage device 110 in the order: $B_1, B_3, B_2, B_5, B_4, B_6, B_8, B_7$. The blocks are said to be stored in a random or non-sequential manner since they are not stored in successive addresses of the storage device.

With the temporal re-ordering scheme discussed above, the blocks may subsequently be transmitted to the block buffers in another sequence, for example, $B_5, B_3, B_2, B_6, B_4, B_7, B_8, B_1$, which differs from both the order that the blocks were provided to the re-ordering circuit 112 as well as the storage sequence.

The authentication and encryption functions and associated elements need not be collocated with the external storage device 110. That is, the encryption circuit 200 may be located at a cable television system headend, or a satellite uplink, while the storage device is part of a descrambling receiver in a consumer's home. The authenticated and/or encrypted program information can be provided to the memory 110 via any convenient channel, for example, such as via a telephone, satellite, cable television link, or computer network. The authenticated and/or encrypted program information may also be installed locally via a smart card, or the storage device 110 itself may be pre-loaded with the encrypted program information prior to the installation and initialization in the descrambling receiver.

Referring again to the descrambling receiver 100 of FIG. 1, address data used by the address scrambler 164 can be stored in an address generator 160 of the ASIC 105. The address data is provided to the external memory 110 via a path 165 so that the scrambled blocks of encrypted instructions can be read out in a desired sequence (e.g., $B_1, B_2, \ldots, B_N$). In particular, blocks which comprise a chain may be read out non-sequentially from the memory 110 to provide the blocks in the unscrambled sequence via line 113. Optionally, the blocks may be transmitted from the external storage device 110, to the secure circuit 105, in the scrambled or random time sequence and descrambled at the ASIC 105 using the block re-ordering circuit multiplexer 112. The address data may also be used by the external storage device 110, to transmit different block chains in a scrambled (e.g., non-sequential order) manner.

The address data and the encrypted blocks $B_1$ through $B_N$ of successive cipher block chains are provided to an encryption/decryption circuit 120 and authentication circuit 125 of the ASIC 105. The encryption/decryption circuit 120 uses the address data to unscramble the cipher block chain sequence as required. Re-ordering may also occur at the block re-ordering circuit multiplexer 112. The encryption/ decryption circuit 120 also receives the secret decryption key from a decryption key memory 150 of the ASIC 105, and performs a decryption algorithm which is the inverse of that used to provide the encrypted blocks. The decryption process is discussed immediately below and also in connection with FIG. 3.

With the block chaining scheme, the blocks B through $B_N$ of each chain must be decrypted in succession. That is, $B_1$ is first decrypted, then the result is used in decrypting $B_2$, and so on. Once blocks $B_1$ through $B_{N-1}$ have been decrypted, the authentication block, $B_N$, can be decrypted, and the authentication information (e.g., checksum or hash) can be calculated by the authentication circuit 125 to authenticate the chain. The correct authentication information may be pre-stored within the authentication circuit 125 and compared to the calculated authentication information to provide the necessary verification. Finally, lines of clear text (e.g., decrypted) program information are obtained and provided to the cache 140.

For secure communication between an external storage device 110, and the secure circuit 105, the outgoing program information from the secure circuit to the storage device must also be authenticated and/or encrypted. Thus, to change a byte or string of data in the external storage device 110, the entire block and block chain must be read into the ASIC, the change made, and then the proper authentication information may be calculated. After the authentication information is calculated, the newly encrypted block information and changed authentication information are written out, for example, using simple block chaining. The program information may be written back to the storage device in a different underlying sequence than it was fetched.

The unmodified blocks do not need to be written out unless the location in the storage has changed. With cipher block chaining, changing one block of data can change subsequent blocks in a chain. Those affected blocks would need to be written out as well.

There are instances when the secure circuit needs to communicate to the outside world in a clear mode, e.g., for printers, error messages, display purposes, and the like. Therefore, the encryption/decryption circuit 120 and/or verification/authentication circuit 125 should have a disable mode whereby program information may be communicated and conditionally bypassed. In such a mode, program information may not be communicated in either a block or a chain since there would not be a requirement for either encryption or authentication. Such a mode may also be useful for debug and testing of the system.

Different chain lengths may be used for communicating different types of program information from the storage device. Program information requiring less latency can have smaller chain lengths. Program information that can tolerate more latency can have longer chain length, thereby saving on the storage of the corresponding authentication information. Thus, the length of each chain can be set according to the processing latency of the program information of the respective chains.

For example, it may be possible to have only two blocks of program information in the chain, one for the data and one for the authentication information. Although an entire chain of program information must be fetched and decrypted first to change even a single byte, a change in data does not have to be written out to the external storage device immediately. Data may be stored internally, such as in the cache 140, until such time that the external storage device needs to be updated. At that time, the ASIC must write the entire chain with the modification back out to the external storage device.

Referring again to the encryption/decryption circuit 120, the decrypted program information is provided to a cache 140 for temporary storage, and to a CPU 170 for execution. The program information may be used to decode a scrambled data transmission using additional processing hardware or software and steps which are not shown, but which are well known in the art.

The cache 140 is a RAM which provides a buffering capability with a relatively high-speed access, and may be sized to store a substantial amount of data. The cache 140 may store thousands of bytes, which corresponds to the size of the instructions and operation data of many block chains. The CPU may execute program information from a first cipher block chain while the encryption/decryption circuit 120 is decrypting blocks from a second, subsequent cipher block chain. The second chain may follow the first chain directly, or may be separated from the first chain by one or more intermediate chains. Thus, system throughput may be improved due to the overlapping activity of the authentication circuit, deciphering circuit and the CPU. Generally, although the execution time of the program information in the CPU will typically be faster than the decryption time in the encryption/decryption circuit 120, efficiencies can be achieved by coordinating the deciphering and execution activities, and optimizing the number of rounds used in the encryption/decryption algorithm.

Additional efficiencies may be realized by writing the program information, e.g. instructions, which are executed by the CPU to conform to the block chain transfer scheme. In particular, the amount of program information in lines of the instructions can conform to the block size and the number of blocks in a chain. For example, lines of instructions should be carried in full in a block chain rather than being split into two chains to avoid waiting for a second block chain to be decoded to recover the remainder of a line. An instruction is typically only a few bytes long (e.g., 1–4 bytes), so a chain of blocks will typically include several instructions.

The cache 140 can optionally receive a signal from the address generator 160 to coordinate the storing and transferring of program information to the CPU 170. For example, the signal may inform the cache 140 that additional block chains are being sent to the buffers, authentication circuit 125 and encryption/decryption circuit 120, so that additional executable program information will be received by the cache 140.

One or more registers 180 may be provided which interface with the cache 140 and CPU 170. Also, a small internal ROM can be used to store boot-up or other program information which may be required in the ASIC 105.

Figure 3:
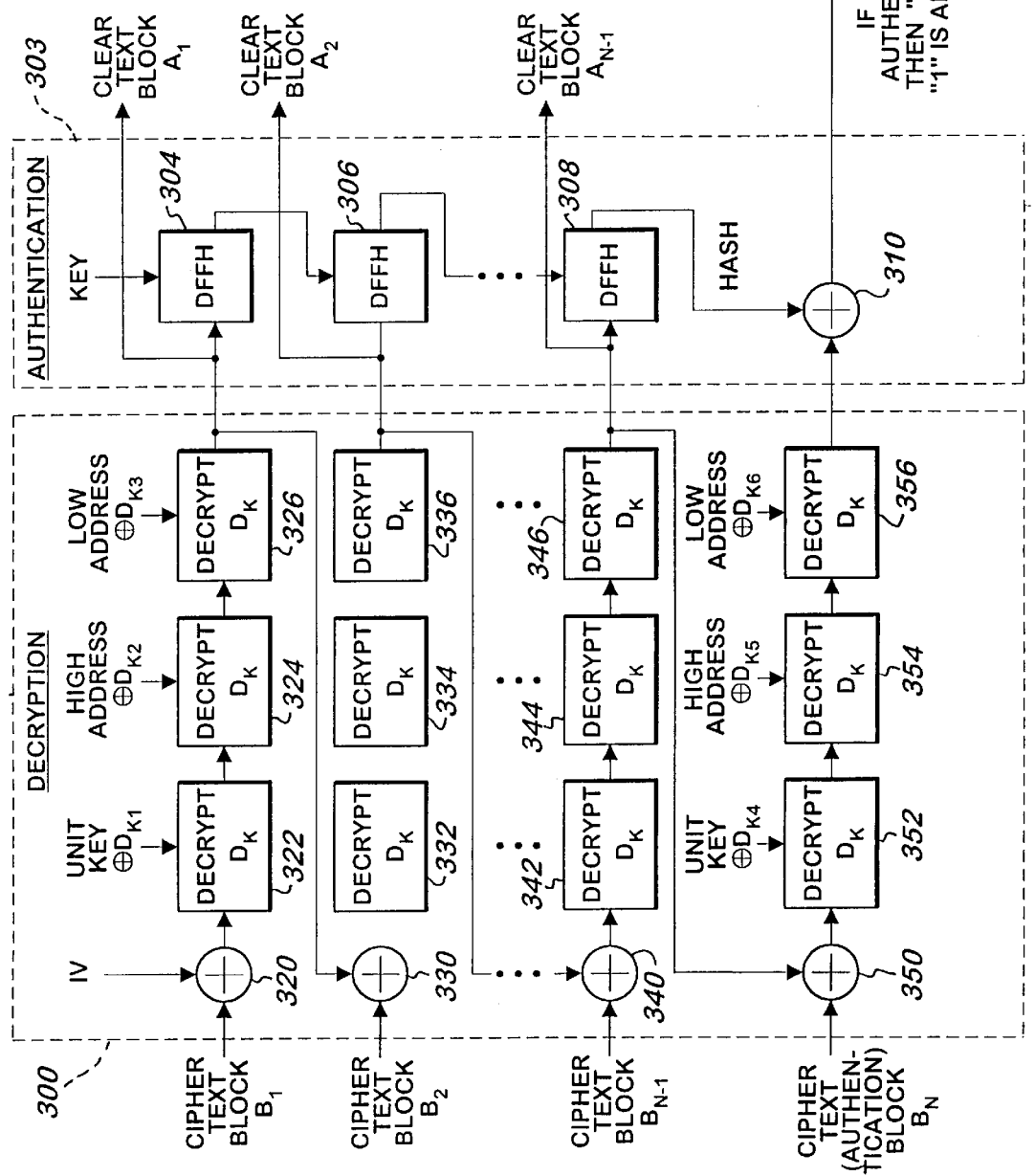
FIG. 3 is a schematic representation of a cipher block chaining decryption scheme in accordance with the present invention.

FIG. 3 is a schematic representation of a cipher block chaining decryption scheme in accordance with the present invention. The scheme shown is the counterpart of the encryption scheme of FIG. 2. Re-ordering is performed when required to obtain the fields in the desired sequence for decrypting. An authentication circuit 303 and decryption circuit 300 are provided. At the decryption circuit, each of the cipher text blocks $B_1, \ldots, B_N$ are decrypted.

First, the respective cipher text blocks are XORed with the prior decrypted clear text block or an initialization vector. Specifically, $B_1$ and the IV used during encryption are received at an adder 320 to provide an output to a triple DES decryption function, including decrypt functions 322, 324 and 326. The clear text block $A_1$ is output from decrypt function 326 and provided to an adder 330 and a hash function 304. At the hash function 304, $A_1$ and a key are hashed to provide an output to successive hash functions 306 and 308, and an adder 310.

The adder 330 receives $A_1$ and $B_2$ to provide an output to decrypt functions 332, 334 and 336 to provide the clear text block $A_2$. Similarly, an adder 340 receives $A_{N-2}$ and $B_{N-1}$ to provide an output to decrypt functions 342, 344 and 346 to provide the clear text block $A_{N-1}$. An adder 350 receives the authentication block $B_N$ as well as $A_{N-1}$ to provide a value to decrypt functions 352, 354 and 356. The output of decrypt function 356 is provided to an adder 310 along with a hash value from hash function 308 to produce an output of either one or zero. If the output is zero, then the authentication value is valid since it matches the hash value, and an enable signal is set to allow processing to continue. However, if the output of the adder 310 is one, then the authentication value is not valid, and an alarm state may be initiated at the alarm circuit 162 to provide a kill (erase) signal for partial or full erasure of the contents of the key storage device 150.

When block re-ordering is used, a pirate attempting to trial program information and the authentication information value will likely create invalid op-codes. Invalid op-codes are hex data instructions for which there is no corresponding action. Various options exist for handling an authentication value or op-code that does not check out. One possibility is to perform a reset of the secure circuit, which would require the pirate to reconfigure and re-initialize the ASIC for another attack.

Another possibility is to cause the processor in the ASIC to jump to an infinite "no operation" (NOP) loop. This is a state where the ASIC performs no substantial operation, requiring the pirate to first detect the NOP operation, then force a reset himself, and reconfigure, and re-initialize the ASIC for another attack. Or, the number of mismatches between the pre-stored value and the decrypted value may be counted such that one or all of the stored keys are erased when a threshold number of mismatches are detected. These keys could be sensitive keys whereby knowledge in the outside world could pose a major security breach. Their erasure would cause a permanent malfunction of an otherwise good unit.

Another possible countermeasure is to erase a temporary key, such as one of the delivered keys, rather than a key which is loaded at unit initialization, or creation time. This forces the pirate to contact the network service provider for re-authorization, thereby potentially exposing the pirate. In the preferred embodiment emphasizing security, all of the keys would be erased.

Figure 4:
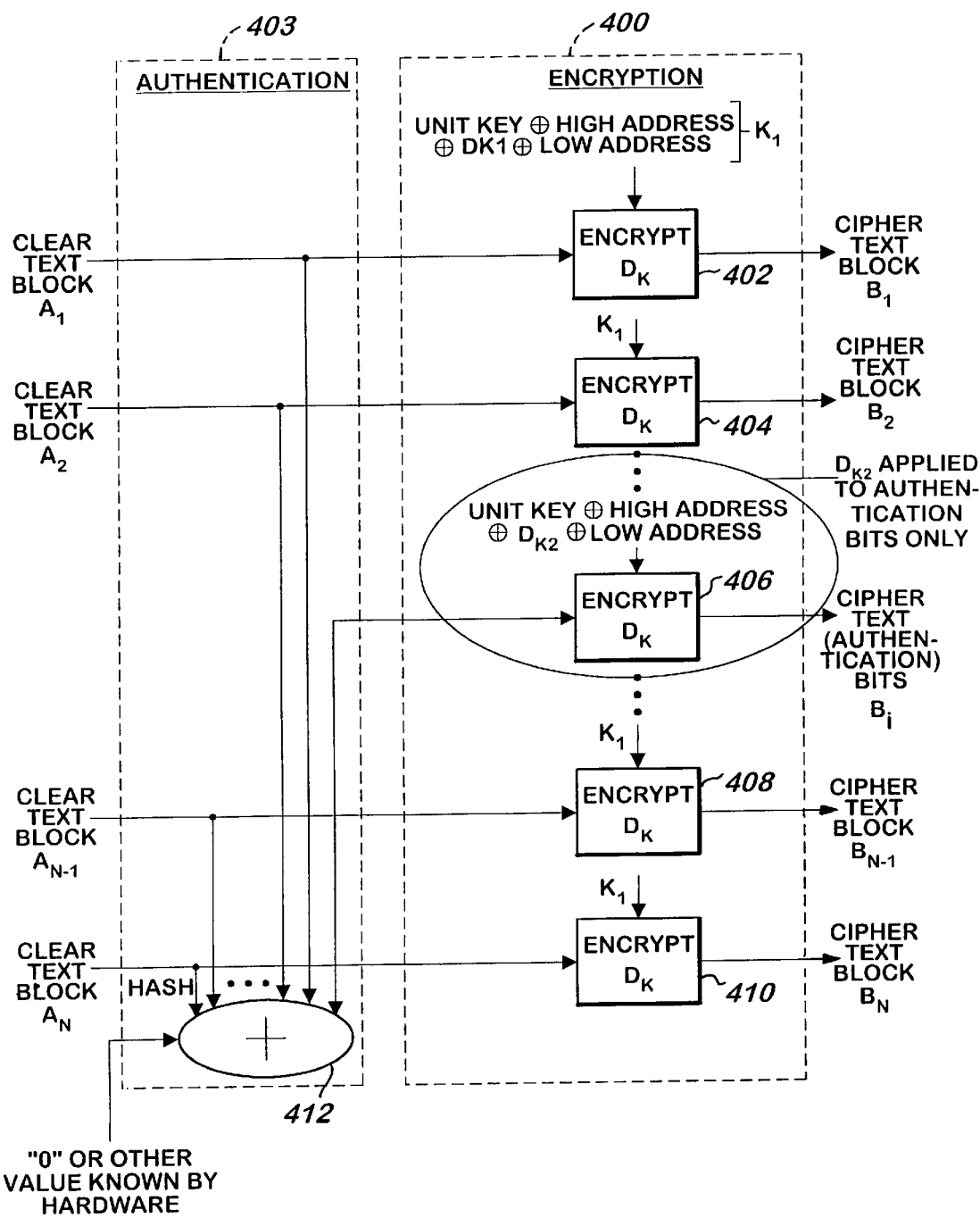
FIG. 4 is a schematic representation of a simple block chaining encryption scheme in accordance with the present invention.

FIG. 4 is a schematic representation of a simple block chaining encryption scheme in accordance with the present invention. As discussed above, this configuration can avoid latency problems which are characteristic of the cipher block chaining technique of FIGS. 2 and 3. Encryption of all clear text blocks may be carried out independently and substantially in parallel. Encryption and decryption of the authentication information depends on the clear text blocks. The simple block encryption technique may have greater susceptibility to some trialing attacks by pirates, however, since the modification of a block will not affect other blocks, other than the authentication information.

An authentication circuit 403 and encryption circuit 400 are provided. Blocks of clear text program information $A_1$, $A_2, \ldots, A_N$ are processed to provide corresponding blocks of cipher text, $B_1, B_2, \ldots, B_N$, respectively. One of the cipher text blocks, designated generically as $B_i$, is an authentication block, and can assume any position among the other cipher text blocks (e.g., $1 \leq i \leq N$).

At the encryption circuit 400, block $A_1$ is encrypted at a function 402 to provide block $B_i$, block $A_2$ is encrypted at a function 404 to provide block $B_2$, block $A_{N-1}$ is encrypted at a function 408 to provide block $B_{N-1}$, and block $A_N$ is encrypted at a function 410 to provide block $B_N$. Additionally, each of the clear text blocks is provide to an adder 412 in the authentication circuit 403 to provide a value to an encrypt function 406 to produce a cipher text authentication block, $B_i$. $B_i$ can be the first block $B_1$, the last block $B_N$, or any block in between. The adder 412 also receives a zero or other value which is known by the hardware.

Each of the encrypt functions for the non-authentication blocks, e.g., functions 402, 404, 408 and 410, may operate under the same key $K_1$, which is obtained by XORing a unit key, high order address bits, a secret key $D_{K1}$ and low order address bits. The encryption function for the authentication block, e.g., function 406 may operate under a different key, $K_2$, which is obtained using a secret key $D_{K2}$. The encrypted blocks can be provided to the block re-ordering circuit, as discussed previously.

In accordance with the present invention, authentication information is derived from the clear text blocks by providing an adder 412 which takes the XOR of the clear text blocks $A_1, A_2, \ldots, A_N$ and, optionally, a pre-stored value. The output of the adder 412 is subsequently encrypted at the function 406 to provide the encrypted authentication block $B_i$. Virtually any hash function may be used instead of, or in addition to, the adder 412. Moreover, it is not necessary for each clear text block to be input to the adder 412.

Figure 5:
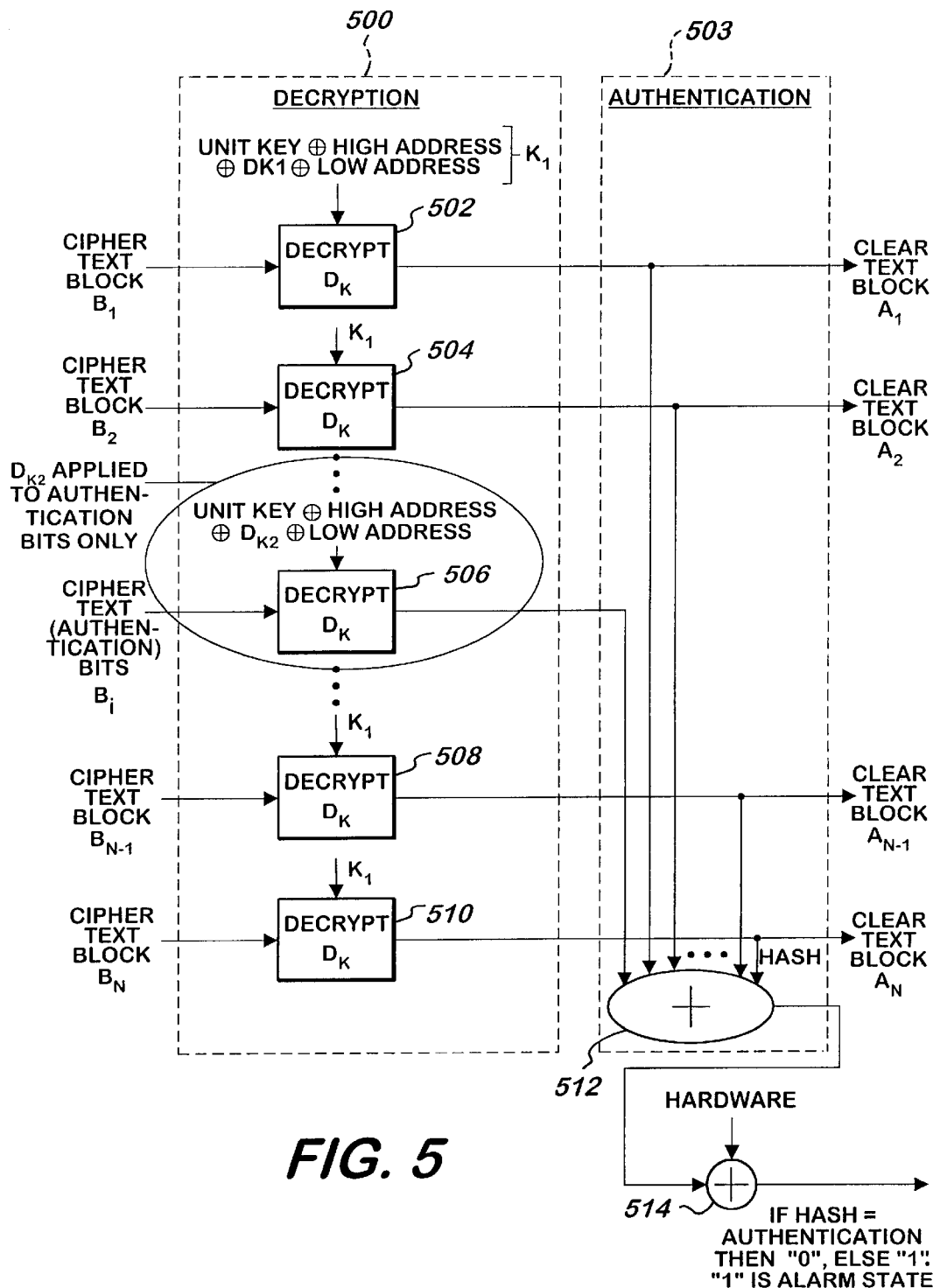
FIG. 5 is a schematic representation of a simple block chaining decryption scheme in accordance with the present invention.

FIG. 5 is a schematic representation of a simple block chaining decryption scheme in accordance with the present invention. The decryptor is the counterpart of the encryptor of FIG. 4. Re-ordering is performed when required to obtain the blocks in the desired sequence for decrypting.

A decryption circuit 500 and authentication circuit 503 are provided. Decrypt functions 502, 504, 508 and 510 use a key $K_1$ as shown to decrypt cipher text blocks $B_1, B_2, B_{N-1}$ and $B_N$, respectively, to provide the clear text blocks $A_1, A_2, A_{N-1}$ and $A_N$. The cipher text authentication block $B_i$ is decrypted at a function 506 using a different key. The outputs from each of the decrypt functions is provided to an adder 512 to provide a hash value which, in turn, is summed at an adder 514 with a pre-stored hardware value.

If the output of the adder 514 is zero, then the hash value and hardware value are the same, and the authentication data is verified, and subsequent processing is enabled. However, if the output of the adder 514 is one, then the hash value and hardware value are different, and the authentication data is not verified, so an alarm state is set.

Figure 6:
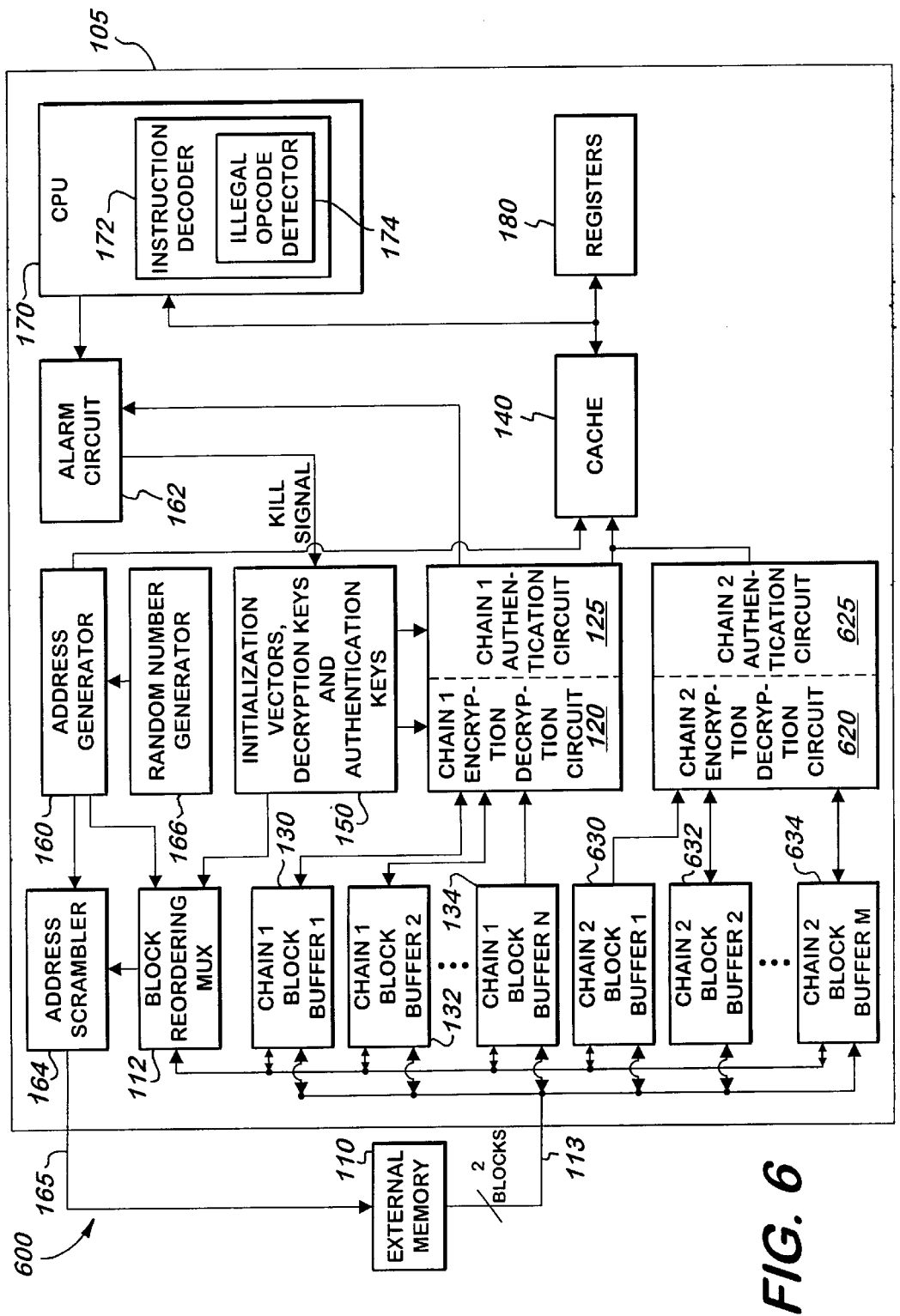
FIG. 6 is a schematic diagram of an alternative cryptographic key generator/descrambling receiver apparatus in accordance with the present invention.

FIG. 6 is a schematic diagram of an alternative cryptographic key generator/descrambling receiver apparatus in accordance with the present invention. Like-numbered elements correspond to the elements of FIG. 1. The receiver, shown generally at 600, includes chain block buffers 130, 132 and 134 which are used for the first, second and Nth blocks, respectively, of a first chain, and block buffers 630, 632 and 634 which are used for the first, second and Mth blocks, respectively, of a second chain. With this scheme, two or more blocks (one from each chain) can be communicated over line 113 at the same time. Moreover, additional block buffers may be provided to store data from more than two chains. Each chain can have the same or different lengths.

The encryption/decryption circuit 120 and authentication circuit 125 process chain 1, while the encryption/decryption circuit 620 and authentication circuit 625 process chain 2.

The data from the key storage device 150 may be provided to the circuits 120, 125, 620 and 625 as required for each of the chains. Moreover, although shown as separate elements, the authentication circuit 125 and encryption/decryption circuit 120 may share common circuitry with the authentication circuit 625 and encryption/decryption circuit 620.

The embodiment of FIG. 6 allows for re-ordering across two or more chains when cipher block chaining is used. As discussed, when cipher block chaining is used, each block in a chain must be temporarily stored to recover the authentication block. The receiver 600 can therefore provide parallel processing of two of more cipher block chains, chain-wise re-ordering, or block-wise re-ordering across two or more chains.

Accordingly, it can be seen that the present invention provides an apparatus for descrambling a scrambled data transmission by transferring authenticated and, optionally, encrypted program information from an external storage device to a secure circuit in a simple block chain. Encrypted and optionally authenticated program information is also transferred from the external storage device to the secure circuit in the cipher block chain. The scheme allows upgrades and other changes to descrambling instructions to be easily made without modifying the secure circuit.

Additionally, the use of block chaining improves system throughput and reduces system cost by reducing authentication information overhead. Further efficiencies are obtained by providing a cache to transfer two or more lines of decrypted or authenticated program information to the CPU in a single clock cycle, and by managing the timing of block deciphering with the transfer of decrypted data to the cache and the CPU.

An alternative embodiment of the invention uses simple block encryption instead of cipher block chaining. With this scheme, the blocks of the chain are authenticated by using a large authentication field as with the cipher block chaining. However, the chain of blocks may be decrypted and authenticated substantially in parallel rather than serially.

Re-ordering of the block chain using any field such as byte, block, and/or chain level is also provided, in addition to scrambled address storage at the external storage device.

Additionally, a bi-directional capability may be provided to allow program information to be transferred from the secure circuit to the external storage device. The program information need not be encrypted but only authenticated for security.

Although the invention has been described in connection with various specific embodiments, those skilled in the art will appreciate that numerous adaptations and modifications may be made thereto without departing from the spirit and scope of the invention as set forth in the claims.

For example, the invention is particularly suitable for deterring the copying and reverse engineering of proprietary software algorithms, and for securing cryptographic applications such as the descrambling of data transmissions such pay-TV programs to prevent unauthorized users from receiving television broadcasts. The invention is equally useful in other applications, including terminals and smart cards for electronic funds transactions, premises access control, electronic games, commodities and stock data used by traders, data which is transferred via the Internet or other computer networks, and so forth.

Moreover, the invention is compatible with alternative encryption schemes such as a stream cipher, or a combination of both a stream cipher and cipher block chaining such as the Common Scrambling Algorithm (CSA).

Another such scheme is public key encryption. Because each block and chain is relatively small compared to the modulus sizes of say the RSA Public Key system which can have sizes of 2048 bits (256 eight bit bytes), it is possible to use RSA to encrypt one or more program information chains. If the RSA public key system were used, then it may be preferable to use an unbalanced exponent pair whereby the decryption private exponent was small, for example, equal to three. That would lower program information latency. After decryption, the authentication information could be checked as in the block encryption techniques described above and decrypted and checked, or simply checked. This makes it difficult to set the decrypted authentication value. And, as mentioned above, a combination of a secret key and a public key can be used.

What is claimed is:

1. An apparatus for processing program information, comprising:

a secure circuit including a central processing unit (CPU) and at least one block buffer for storing at least one block of the program information;

an external storage device which is adapted to store the program information external to said secure circuit;

a first communication path which is adapted to communicate a group of blocks of said program information from said external storage device to said at least one block buffer in a first block chain; and a second communication path which is adapted to communicate the program information from the at least one block buffer to the CPU for processing therein; wherein:

the first block chain comprises authentication data derived from the group of blocks of program information; and said secure circuit comprises an authentication circuit that is responsive to said at least one block buffer for processing the first block chain to verify the authentication data thereof prior to the program information being communicated to the CPU.

2. The apparatus of claim 1, wherein:

said block chain is a simple block chain such that said group of blocks in said first block chain are processed substantially in parallel by said authentication circuit.

3. The apparatus of claim 1, wherein:

said first block chain and a subsequent second block chain of said program information are communicated between the external storage device and said at least one block buffer; and said authentication circuit is adapted to authenticate at least a portion of the program information of said first block chain while at least a portion of said second block chain is being communicated over said first communication path.

4. The apparatus of claim 1, wherein:

said first communication path is adapted to communicate blocks of program information from said storage device to said at least one buffer in a second chain; and said authentication circuit is adapted to authenticate program information from at least a portion of said first block chain and at least a portion of said second chain substantially concurrently.

5. The apparatus of claim 1, further comprising:

a cache arranged in said second communication path which is adapted to temporarily store the authenticated program information before the authenticated program information is provided to said CPU.

6. The apparatus of claim 1, further comprising:
means for detecting an illegal operational code in the program information.

7. The apparatus of claim 1, wherein:
at least part of said program information is hashed to provide said block chain.

8. The apparatus of claim 1, further comprising:
address generating means for providing addressing information to the external storage device for communicating said blocks of program information from the external storage device to said at least one block buffer in a desired sequence.

9. The apparatus of claim 1, wherein said program information comprises a plurality of strings which are to be processed in succession by said CPU.

10. The apparatus of claim 1, wherein:
said blocks of program information are stored in non-sequential storage address locations of the external storage device.

11. The apparatus of claim 1, wherein:
chains of said program information with randomly varying lengths are communicated from the external storage device to said at least one block buffer.

12. The apparatus of claim 11, further comprising:
address generating means for providing addressing information to the external storage device for communicating said blocks of program information from the external storage device to said at least one block buffer in a desired sequence; wherein:
the randomly varying lengths are determined according to said addressing information.

13. The apparatus of claim 1, further comprising:
means for providing a substantially random block-wise re-ordering of said first block chain, and random re-ordering of a block of said first block chain to communicate a re-ordered chain from the external storage device to said at least one block buffer.

14. The apparatus of claim 1, wherein:
said program information comprises dummy data which is not processed by the CPU.

15. The apparatus of claim 1, wherein:
said program information stored in the external storage device is encrypted;
said secure circuit comprises a decryption circuit which is responsive to said at least one block buffer for decrypting the encrypted program information; and
said second communication path is adapted to communicate the decrypted program information from the decryption circuit to the CPU for processing therein.

16. The apparatus of claim 15, wherein:
said first block chain and a subsequent second block chain of said program information are communicated between the external storage device and said at least one block buffer; and
said decryption circuit is adapted to decrypt at least a portion of the program information of said first block chain while at least a portion of said second block chain is being communicated over said first communication path.

17. The apparatus of claim 15, wherein:
said first communication path is adapted to communicate blocks of program information from said storage device to said at least one buffer in a second chain; and
said decryption circuit is adapted to decrypt program information from at least a portion of said first block chain and at least a portion of said second chain concurrently.

18. The apparatus of claim 15, further comprising:
a cache arranged in said second communication path which is adapted to temporarily store the decrypted program information before the decrypted program information is provided to said CPU.

19. The apparatus of claim 15, wherein: said first block chain is a cipher block chain.

20. The apparatus of claim 1, further comprising:
a third communication path which is adapted to communicate a group of blocks of program information from said secure circuit to said external storage device in a second block chain.

21. The apparatus of claim 20, further comprising:
an encryption circuit for encrypting the program information for the second block chain.

22. The apparatus of claim 21, wherein said encryption circuit is conditionally responsive to address information to allow a clear mode for the program information for the second block chain.

23. The apparatus of claim 20, further comprising:
an authentication circuit for authenticating the program information for the second block chain.

24. The apparatus of claim 23, wherein said authentication circuit is conditionally responsive to address information to allow a clear mode for the program information for the second block chain.

25. The apparatus of claim 20, further comprising:
a re-sequencing circuit for randomly re-ordering the program information for the second block chain.

26. The apparatus of claim 20, further comprising:
a dummy-data insertion circuit for adding dummy-data to the program information for the second block chain.

27. The apparatus of claim 1, wherein a plurality of chains of program information are communicated from the external storage device to said secure circuit in a randomly varying sequence.

28. An apparatus for communicating program information, comprising:
a secure circuit for providing said program information;
an external storage device which is adapted to store the program information external to said secure circuit; and
a first communication path which is adapted to communicate a group of blocks of said program information from said secure circuit to the external storage device in a first block chain; wherein:
units of said program information are communicated from said secure circuit to the external storage device using randomly varying sequences.

29. The apparatus of claim 28, wherein:
said program information comprises authentication data; and
said secure circuit comprises an authentication circuit for providing said authentication data.

30. The apparatus of claim 29, wherein:
said block chain is a simple block chain such that said group of blocks in said first block chain are processed in parallel by said authentication circuit to provide said authentication data.

31. The apparatus of claim 29, wherein:
said authentication circuit hashes at least part of the program information to provide said authentication data.

32. The apparatus of claim 28, further comprising:
address generating means for providing addressing information to the external storage device for communicating said blocks of program information from said secure circuit to the external storage device in a desired sequence.

33. The apparatus of claim 28, wherein:

said blocks of program information are stored in the external storage device in scrambled storage locations.

34. The apparatus of claim 28, wherein:

units of said program information with randomly varying lengths are communicated from said secure circuit to the external storage device.

35. The apparatus of claim 28, further comprising:

means for providing at least one of (a) random block-wise re-ordering of said first block chain, and (b) random re-ordering of a block of said first block chain to communicate a re-ordered chain from said secure circuit to the external storage device.

36. The apparatus of claim 28, wherein:

units of said program information are communicated from said secure circuit to the external storage device using randomly varying lengths.

37. The apparatus of claim 28, wherein: said program information comprises dummy data which was not processed by the CPU.

38. The apparatus of claim 28, wherein said program information is provided in block chains.

39. The apparatus of claim 28, wherein: said secure circuit comprises an encryption circuit for encrypting said program information; and said first communication path is adapted to communicate the encrypted program information from the encryption circuit to the external storage device.

40. The apparatus of claim 39, wherein: said block chain is a cipher block chain.

41. The apparatus of claim 28, further comprising:

a communication path which is adapted to communicate a group of blocks of program information from said external storage device to said secure circuit in a second block chain.

42. The apparatus of claim 41, wherein the program information stored in said external storage device is encrypted, said secure circuit further comprising:

a decryption circuit for decrypting the encrypted program information in the second block chain.

43. A method for processing program information, comprising the steps of:

storing at least one block of the program information in a secure circuit that includes a central processing unit (CPU) and at least one block buffer;

storing the program information external to said secure circuit in an external storage device;

communicating a group of blocks of said program information from said external storage device to said at least one block buffer in a first block chain via a first communication path; and communicating the program information from the at least one block buffer to the CPU for processing therein via a second communication path; wherein:

the first block chain comprises authentication data derived from the group of blocks of program information; and said secure circuit comprises an authentication circuit that is responsive to said at least one block buffer for processing the first block chain to verify the authentication data thereof prior to the program information being communicated to the CPU.

44. An apparatus for processing program information, comprising:

a secure circuit including a central processing unit (CPU) and at least one block buffer for storing at least one block of the program information;

an external storage device which is adapted to store the program information external to said secure circuit;

a first communication path which is adapted to communicate a group of blocks of said program information from said external storage device to said at least one block buffer in a first block chain; and a second communication path which is adapted to communicate the program information from the at least one block buffer to the CPU for processing therein; wherein:

units of said program information are communicated from the external storage device to said at least one block buffer using randomly varying sequences.

45. The apparatus of claim 44, wherein said units of program information comprise block chains.

46. An apparatus for processing program information, comprising:

a secure circuit including a central processing unit (CPU) and at least one block buffer for storing at least one block of the program information;

an external storage device which is adapted to store the program information external to said secure circuit;

a first communication path which is adapted to communicate a group of blocks of said program information from said external storage device to said at least one block buffer in a first block chain; and a second communication path which is adapted to communicate the program information from the at least one block buffer to the CPU for processing therein; wherein:

a plurality of units of program information is communicated from the external storage device to said secure circuit in units of varying length; and the length of each unit is determined according to a processing latency of the associated program information of the respective units.

47. An apparatus for processing program information, comprising:

a secure circuit including a central processing unit (CPU) and at least one block buffer for storing at least one block of the program information;

an external storage device which is adapted to store the program information external to said secure circuit;

a first communication path which is adapted to communicate a group of blocks of said program information from said external storage device to said at least one block buffer in a first block chain;

a second communication path which is adapted to communicate the program information from the at least one block buffer to the CPU for processing therein;

a third communication path which is adapted to communicate a group of blocks of program information from said secure circuit to said external storage device in a second block chain; and a length determination circuit for randomly varying the length of units of the program information for the second block chain.

48. An apparatus for processing program information, comprising:

a secure circuit including a central processing unit (CPU) and at least one block buffer for storing at least one block of the program information;

an external storage device which is adapted to store the program information external to said secure circuit;

a first communication path which is adapted to communicate a group of blocks of said program information from said external storage device to said at least one block buffer in a first block chain; and a second communication path which is adapted to communicate the program information from the at least one block buffer to the CPU for processing therein; wherein:

said program information comprises a plurality of strings of instructions which are to be executed by said CPU in a first sequence;

said secure circuit includes a re-ordering means;

in said first block chain, the strings of instructions are provided in a second sequence that differs from the first sequence; and said re-ordering means are associated with the at least one block buffer for re-ordering the strings of instructions to the first sequence.

49. An apparatus for communicating program information, comprising:

a secure circuit for providing said program information;

an external storage device which is adapted to store the program information external to said secure circuit; and a first communication path which is adapted to communicate a group of blocks of said program information from said secure circuit to the external storage device in a first block chain;

wherein a plurality of chains of program information are communicated from said secure circuit to the external storage device in a randomly varying sequence.

50. A method for processing program information, comprising the steps of:

storing at least one block of the program information in a secure circuit that includes a central processing unit (CPU) and at least one block buffer;

storing the program information external to said secure circuit in an external storage device;

communicating a group of blocks of said program information from said external storage device to said at least one block buffer in a first block chain via a first communication path; and communicating the program information from the at least one block buffer to the CPU for processing therein via a second communication path; wherein:

units of said program information are communicated from the external storage device to said at least one block buffer using randomly varying sequences.

51. A method for processing program information, comprising the steps of:

storing at least one block of the program information in a secure circuit that includes a central processing unit (CPU) and at least one block buffer;

storing the program information external to said secure circuit in an external storage device;

communicating a group of blocks of said program information from said external storage device to said at least one block buffer in a first block chain via a first communication path; and communicating the program information from the at least one block buffer to the CPU for processing therein via a second communication path; wherein:

a plurality of units of program information is communicated from the external storage device to said secure circuit in units of varying length; and the length of each unit is determined according to a processing latency of the associated program information of the respective units.

52. A method for processing program information, comprising the steps of:

storing at least one block of the program information in a secure circuit that includes a central processing unit (CPU) and at least one block buffer;

storing the program information external to said secure circuit in an external storage device;

communicating a group of blocks of said program information from said external storage device to said at least one block buffer in a first block chain via a first communication path; and communicating the program information from the at least one block buffer to the CPU for processing therein via a second communication path;

communicating a group of blocks of program information from said secure circuit to said external storage device in a second block chain via a third communication path; and randomly varying the length of units of the program information for the second block chain in accordance with a length determination circuit.

53. A method for processing program information, comprising the steps of:

storing at least one block of the program information in a secure circuit that includes a central processing unit (CPU) and at least one block buffer;

storing the program information external to said secure circuit in an external storage device;

communicating a group of blocks of said program information from said external storage device to said at least one block buffer in a first block chain via a first communication path; and communicating the program information from the at least one block buffer to the CPU for processing therein via a second communication path; wherein:

said program information comprises a plurality of strings of instructions which are to be executed by said CPU in a first sequence;

in said first block chain, the strings of instructions are provided in a second sequence that differs from the first sequence; and said secure circuit includes a re-ordering means that is associated with the at least one block buffer for re-ordering the strings of instructions to the first sequence.

* * * * *